(12) United States Patent
Tennant

(10) Patent No.: US 6,932,019 B1
(45) Date of Patent: Aug. 23, 2005

(54) GUNWALE CLAMP, ATTACHMENTS, AND SUPPORT STRUCTURES

(76) Inventor: James A. Tennant, 2674 T.R. 1087, Perrysville, OH (US) 44684

( * ) Notice: Subject to any disclaimer, the term of this patent is extended or adjusted under 35 U.S.C. 154(b) by 0 days.

(21) Appl. No.: 10/603,523

(22) Filed: Jun. 25, 2003

Related U.S. Application Data

(60) Provisional application No. 60/392,617, filed on Jun. 27, 2002.

(51) Int. Cl.[7] .............................................. B63B 17/00
(52) U.S. Cl. ....................................................... 114/343
(58) Field of Search ................................ 114/343, 364

(56) References Cited

U.S. PATENT DOCUMENTS

| | | | | |
|---|---|---|---|---|
| 1,491,851 A | * | 4/1924 | Ferris .......................... 440/109 |
| 1,609,330 A | * | 12/1926 | Thibodeau .................. 440/103 |
| 2,815,555 A | * | 12/1957 | Robbins ....................... 24/514 |
| 2,869,812 A | * | 1/1959 | Hamel .......................... 248/511 |
| 4,108,413 A | * | 8/1978 | Goserud ....................... 248/214 |

* cited by examiner

*Primary Examiner*—Sherman Basinger
(74) *Attorney, Agent, or Firm*—Nancy Lynn Reeves; Walker & Jocke

(57) ABSTRACT

An apparatus of mounting items to a gunwale of a boat is provided. The apparatus includes a clamp comprised of at least two clamp parts. Each clamp part include a nose part and a shoulder portion. A fastener may extend through each nose part. The nose part of a first one of the clamp parts extends into abutting contact with the shoulder portion of a second one of the clamp parts. The nose part of the second one of the clamp parts extends in abutting contact with the shoulder portion of the first one of the clamp parts. The clamp further includes an aperture bounded by the clamp parts. The aperture includes an opening portion that is operative to extend around the gunwale of a boat. The aperture further includes a stem portion that is operative to extend adjacent each side of a portion of a hull of the boat.

15 Claims, 21 Drawing Sheets

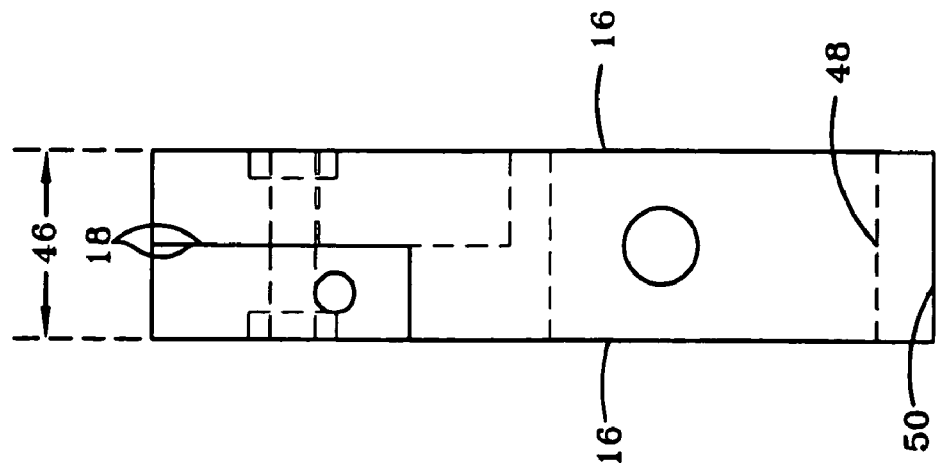
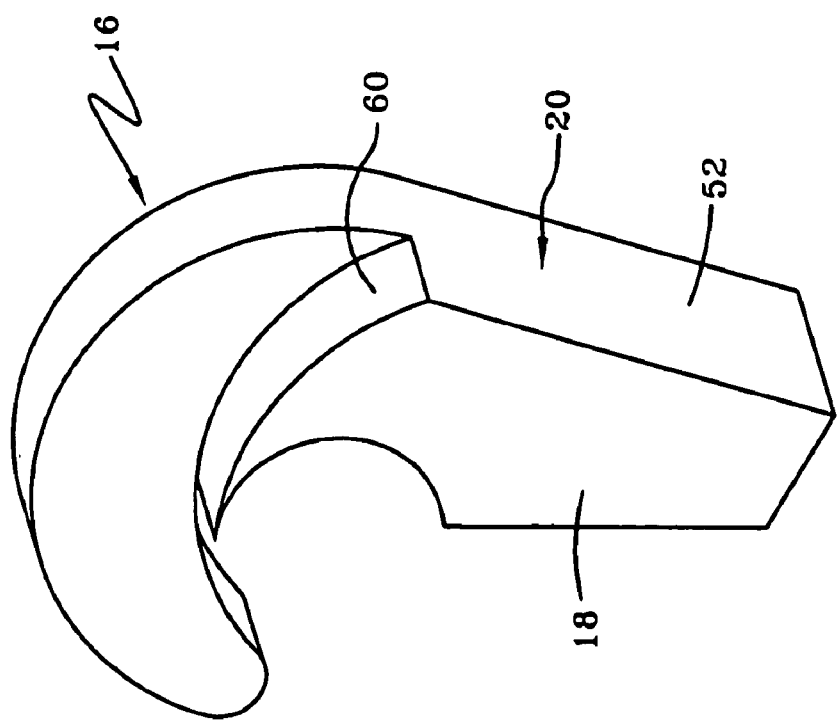

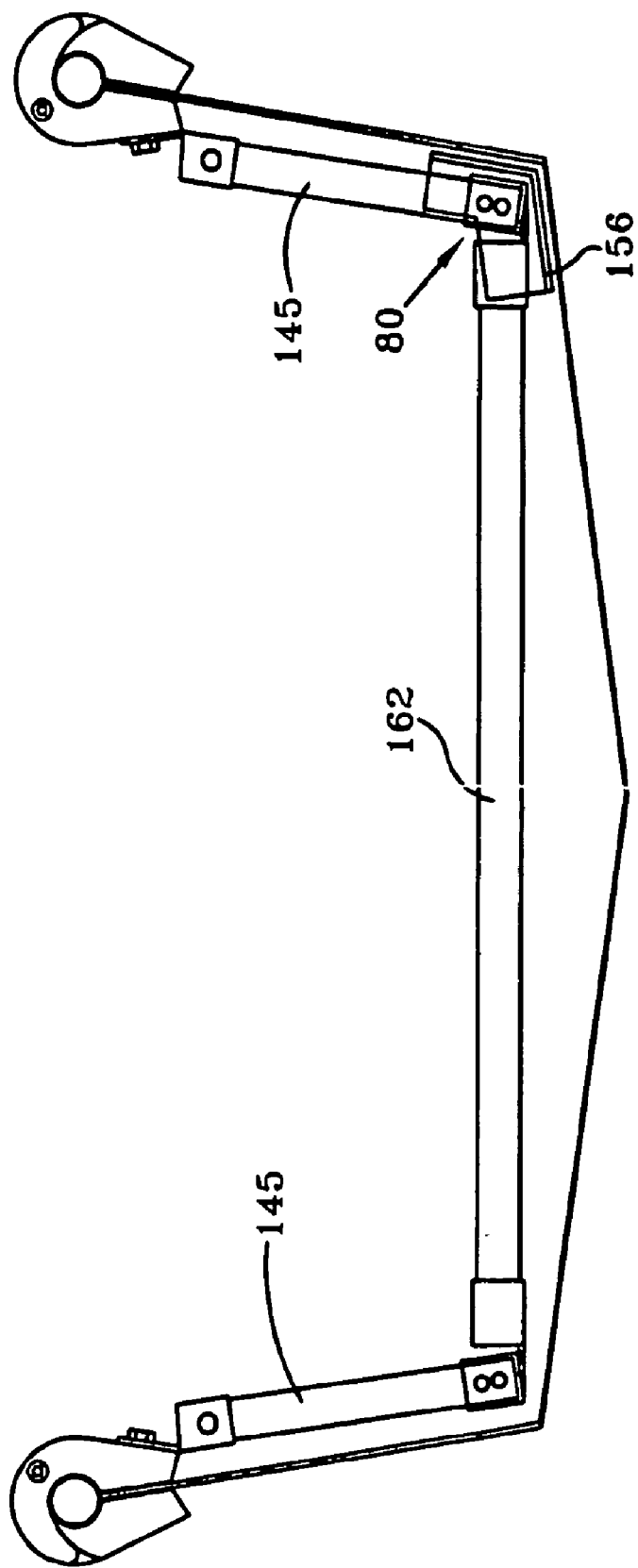

GUNWALE CLAMP, ATTACHMENTS, AND SUPPORT STRUCTURES

CROSS REFERENCE TO RELATED APPLICATIONS

This application claims benefit of U.S. Provisional Application Ser. No. 60/392,617 filed Jun. 27, 2002.

TECHNICAL FIELD

This invention relates generally to boating equipment. Specifically, this invention relates to a clamp which is adapted to attach various items to the gunwale(s) of a boat, and to attachment structures and support members for use with such a clamp.

BACKGROUND ART

In order to adapt a boat for a particular use, it is often necessary to attach items to the boat. For example, fishermen might wish to attach fishing rods or trolling motors, hunters might wish to attach a hunting blind, pleasure boaters might wish to attach cup holders, and particularly in the off season, boaters might wish to hang their boats out of the water or to create a secure covered storage area. Many boats are made with hollow tubular gunwales. The shape of the gunwales stiffens the hull, and helps maintain the shape of the boat, but the shape and hollow construction of the gunwales also makes it difficult to attach items to the boat.

In the past, items have been attached to boats by a variety of methods. These methods include drilling holes in the hull to attach the items directly to the hull, using devices which resemble C-clamps to straddle the gunwale and attach to the hull, or using devices which resemble vice clamps to attach items directly to the gunwale.

Each of these method is often unsatisfactory for one or more reasons. Devices which require drilling a hole in the hull of the boat permanently mar the boat. In addition, such holes may diminish the structural integrity of the boat. Devices which resemble C-clamps are bulky and intrusive. In addition these devices clamp to the hull which concentrates the forces associated with supporting the attached item onto a small clamping area on the hull. This can dent or bend the hull and/or gunwale, particularly when the item being supported is heavy.

Devices which resemble vice clamps are similarly bulky. When mounted to a hollow gunwale, such devices may crimp the gunwale. Crimping of the gunwale mars the boat and may damage the structural integrity of the gunwale and the boat itself.

Thus, there is a need for a compact clamp which does not permanently mar the hull or gunwale of a boat. Further there is a need for a clamp which is versatile enough to be used to attach items as light and fanciful as a cup holder, and as heavy and utilitarian as a trolling motor. Finally, there is a need for attachment structures and support members to be used with such a clamp which are adapted to hold or support items to the boat.

DISCLOSURE OF INVENTION

It s an object of an exemplary form of the present invention to provide a clamp which does not require piercing the hull of the boat to which it is attached.

It is a further object of an exemplary form of the present invention to provide a clamp which does not crimp the gunwales of the boat to which it is attached.

It is a further object of an exemplary form of the present invention to provide a clamp which distributes the forces associated with supporting a heavy item in a manner that does not damage either the hull or the gunwales of the boat to which it is attached.

It is a further object of an exemplary form of the present invention to provide a clamp which is compact.

It is a further object of an exemplary form of the present invention to provide attachment structures for use with an exemplary embodiment of the clamp which are adapted to support items on the boat.

Further objects of an exemplary form of the present invention will be made apparent in the following Best Modes for Carrying Out Invention and the appended claims.

The foregoing objects are accomplished in an exemplary embodiment by a clamp formed from two substantially similar hook shaped clamp parts. These hook shaped clamp parts fit together, with the nose portion of each clamp part operative to rest against a shoulder portion of the other clamp part, creating a central aperture which clampingly surrounds the gunwale. The aperture which is created may be generally circular with a relatively narrower passage or stem extending from the circular portion between the bases of the hook shaped clamp parts. The base of one hook shaped clamp part is operative to rest against the inner hull of the boat, and the base of the other hook shaped clamp part is operative to rest against the outer hull. The two hook shaped clamp parts may be held in operative connection with each other by one or more fasteners.

The shape of the hook shaped clamp parts and the mechanical interaction between the gunwale and the two clamp parts spreads forces associated with the weight of the attached item across several surfaces: the connecting surfaces between the nose of one clamp part and the shoulder of the other clamp part, the connecting surfaces of the aperture in the clamp and the outer surface of the gunwale, and the connecting surfaces of the narrow opening and the inner and outer surfaces of the hull.

With appropriate attachments, described in more detail below, exemplary embodiments may be used to support and attach one or more items to the boat and may be used to support the boat itself.

In other exemplary embodiments, the two portions of the clamp may not be identical in order to adapt to differing hull or gunwale shapes, or to accommodate items already installed in the interior of the boat. Alternative exemplary embodiments may include structural adaptations to create additional or different biasing forces between the clamp, the gunwale, and the hull. In still other embodiments the clamp parts may include a plurality of interlocking finger like nose parts, or additional adaptations for mating the two clamp parts together.

BRIEF DESCRIPTION OF DRAWINGS

FIG. 6 is a perspective view of the clamp part with a shoulder visible.

FIG. 7 shows the clamp of FIG. 1, rotated 90 degrees clockwise about a vertical axis.

FIG. 27 shows a cross-sectional view of an exemplary embodiment of a floor deck mounted to a boat using exemplary embodiments of the clamps.

BEST MODES FOR CARRYING OUT INVENTION

Figure 1:
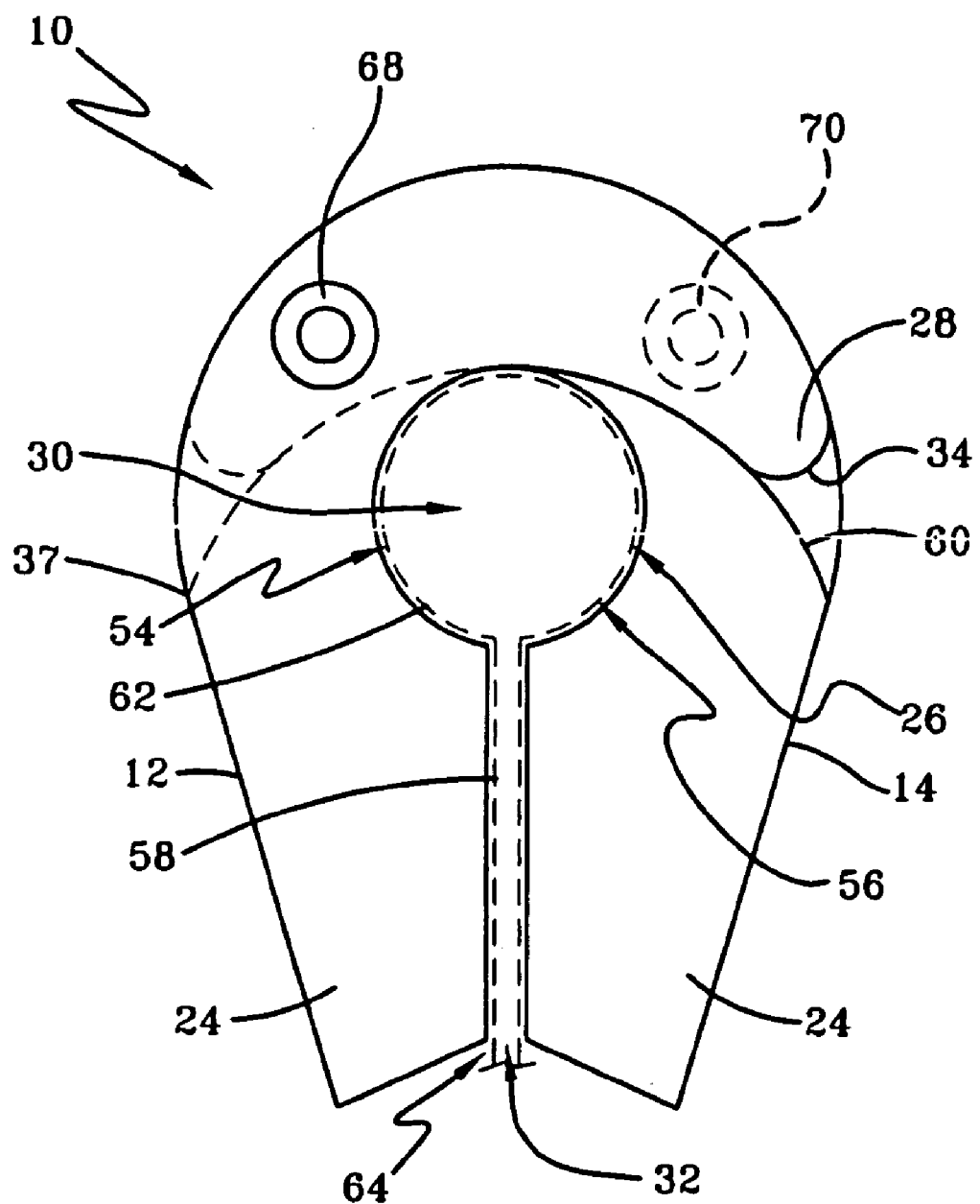
FIG. 1 shows a side plan view of an exemplary embodiment of a clamp.
Figure 2:
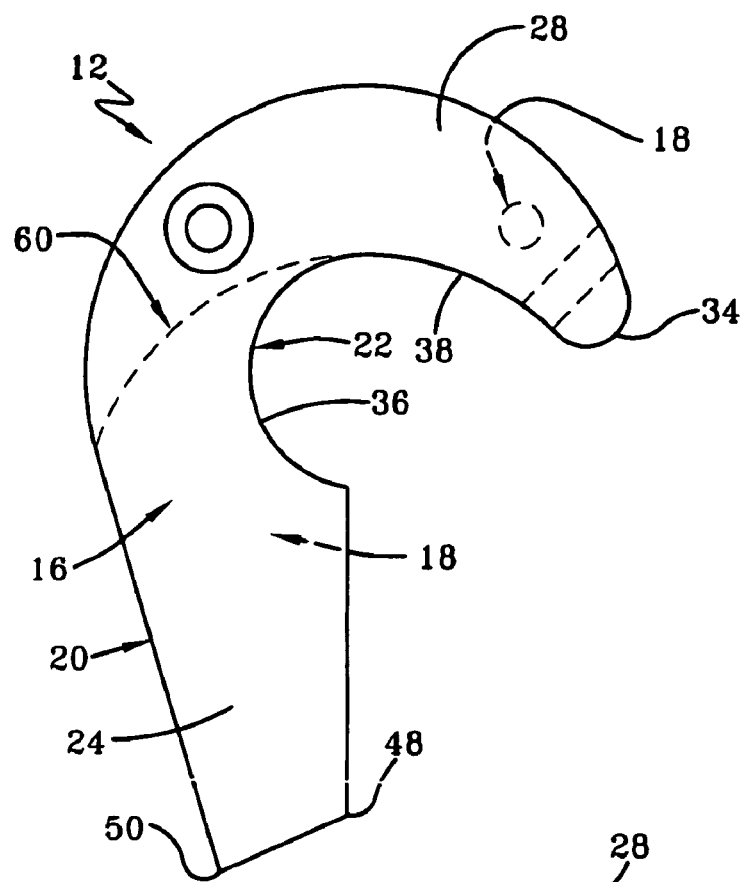
FIG. 2 shows a side plan view for an outer surface of a clamp part.
Figure 3:
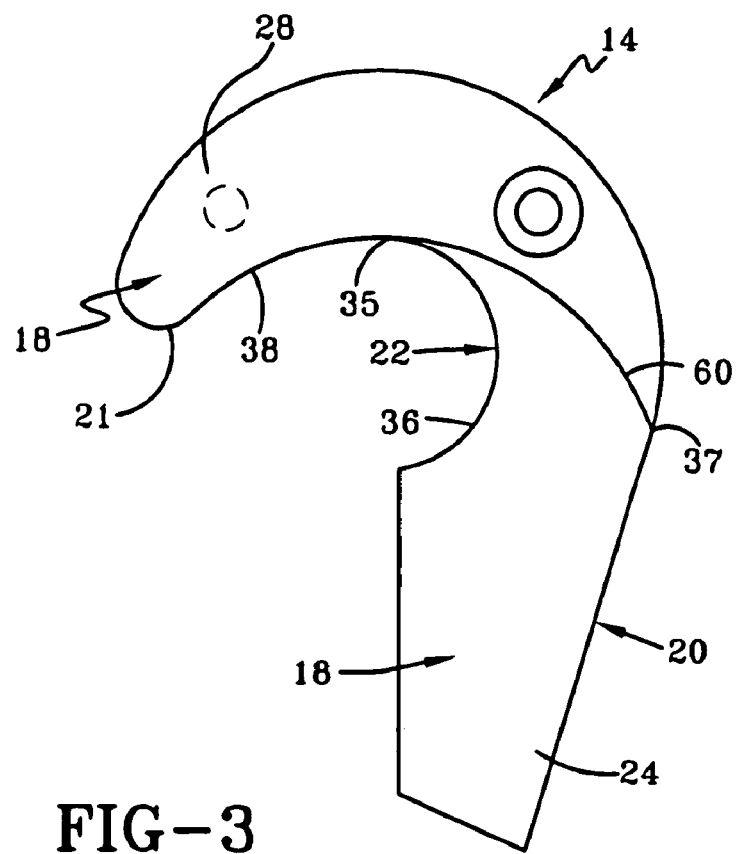
FIG. 3 shows a side plan view for an inner surface of the clamp part.

Referring now to the drawings, in particular to FIG. 1 there is shown therein an exemplary embodiment of a clamp 10. Clamp 10 may be comprised of first and second clamp parts 12 and 14. In an exemplary embodiment illustrated in FIG. 1, both clamp parts 12 and 14 may be substantially similar. The first clamp part 12 is illustrated in FIG. 2. The second clamp part 14 is illustrated in FIG. 3. Each clamp part may have an outer surface 16, an inner surface 18, an attachment surface 20, and clamping surface 22. Viewed from the outer surface 16 of clamp part 12, illustrated in FIG. 2, clamp part 12 resembles a hook, comprising a base part 24, and a finger like nose part 28. As shown in FIG. 3, the base part 24 of each of the clamp parts includes a shoulder portion 60 which extends from the clamping surface 22 to the attachment surface 20 along the inner surface 18 of clamp part. The second clamp part 14 shown in FIG. 3 may be generally similar to the first clamp part 12 shown in FIG. 2, and the same reference numerals are used herein for the similar structural features. Where a second clamp part 14 is necessarily different from a first clamp part 12, a distinction is noted and, if helpful for clarity, different reference numerals are used.

The composition of the clamp parts is primarily a matter of design choice, and many suitable materials are available, including wood, plastic, PVC, stainless steel, aluminum or any other generally rigid material. In the exemplary embodiments illustrated, the edges of the clamp parts are angular. However, it is to be understood that in other exemplary embodiments, the edges may be rounded, or may be a combination of rounded and angular.

As illustrated in FIG. 1, an exemplary clamp 10 may be formed from first and second clamp parts 12 by placing the inner surfaces 18 of first and second clamp parts 12 and 14 in operative connection with each other. In this orientation, the nose part 28 of each of the first and second clamp parts 12 and 14 is operative to rest against the shoulder 60 of each of second and first clamp parts 14 and 12, creating an aperture 26 adapted to surround a gunwale 62 and an adjacent portion of the hull 58 in a clamping manner. The aperture 26 may be comprised of an relatively wider opening portion 30 adjacent the gunwale 62 and a relatively narrower stem portion 32 adjacent the hull 64 of the boat and extending between the base parts 24 of first and second clamp parts 12 and 14.

Figure 9:
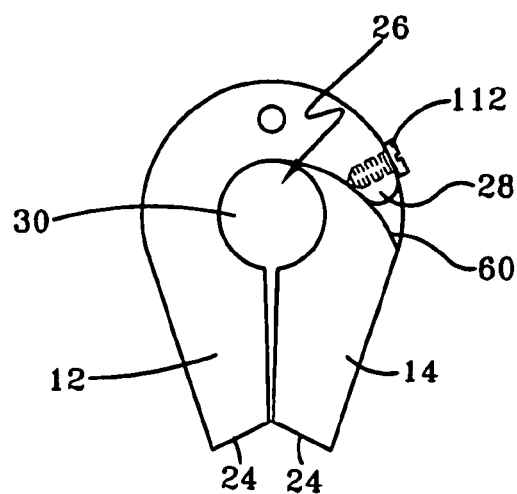
FIG. 9 shows an alternative exemplary embodiment of the clamp with a tensioning screw.

The first clamp part 12 may be attached to the second clamp part 14 using one or more fasteners. Attachment of the first and second clamp parts using two fasteners, 68 and 70, is illustrated in FIG. 1. Attachment of first and second clamp parts using one fastener is illustrated in FIG. 9. In an exemplary embodiment, the fasteners may include bolts, screws, cotter pins, spring clamps, brackets, and adhesives. However, it is to be understood that in alterative exemplary embodiments other types of fasteners may be used which are operative to hold the two clamp parts together.

Figure 25:
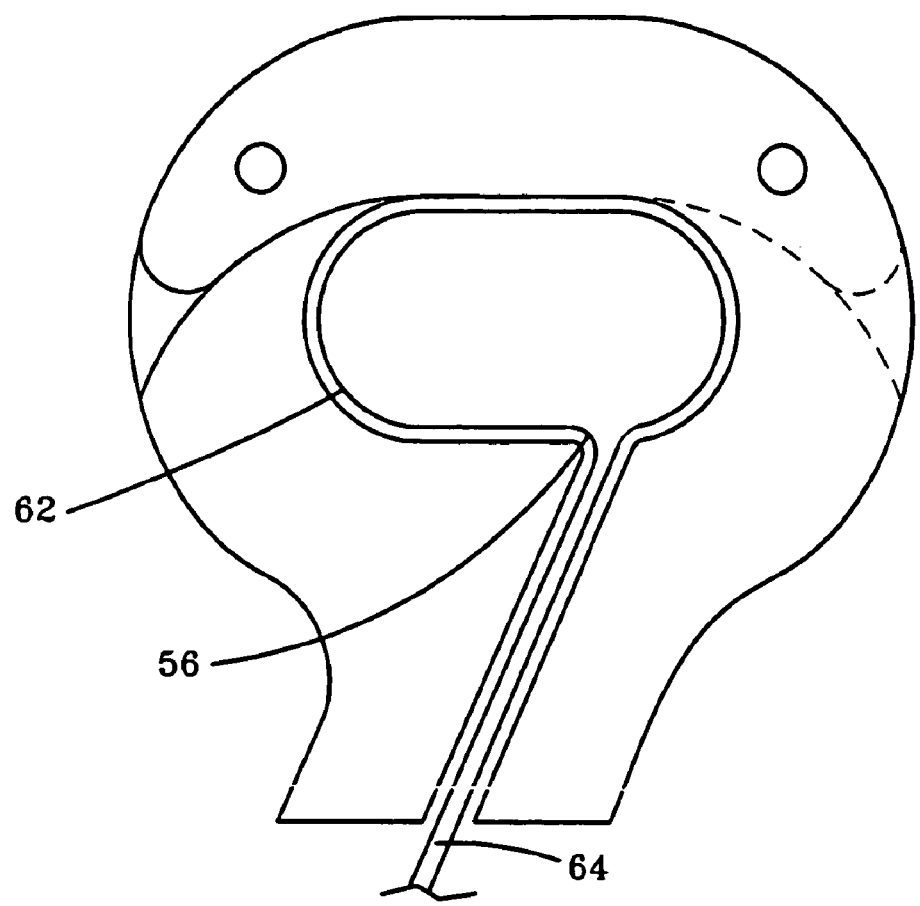
FIG. 25 shows a side plan view of an alternative exemplary embodiment of the clamp for use with an asymmetrically shaped gunwale.

As shown in FIG. 2, the clamping surface 22 corresponds to the surface of the inside of the hook shaped clamp part 12, from the tip 34 of the nose part 28 to the inner end 48 of the base part 24. A clamping surface 22 may be comprised of two functional portions, a clamping portion 36 and an extending portion 38. The shape of the clamping portion 36 may be adapted to conform to the outer contour or shape 54 of the hull 58 and gunwale 62 of a boat, as illustrated in FIG. 1. The outer surface 54 extends from a point on the outside of the hull 64 slightly below the gunwale 62 to the point on the gunwale 62 which is generally opposite the attachment of the gunwale 62 to the hull 64. If the gunwale 62 on which the clamp 10 is to be used is not symmetrical in shape, as illustrated in FIG. 25, clamp part 14 may be different from clamp part 12. The clamping portion 36 of a second clamp part 14 may conform to the inner surface 56 of a hull 64 and gunwale 62 of a boat. The inner surface 56 extends from a point on the inside of the hull 64 slightly below the gunwale 62 to the point on the gunwale 62 which is generally opposite the attachment of the gunwale 62 to the hull 64.

As illustrated in FIGS. 2 and 3, the extending portion 38 of the clamping surface 22 on the first clamp part 12 may conform to the shape of the shoulder portion 60 of the second clamp part 14 so that when the first and second clamp parts 12 and 14 are placed in operative connection to form a clamp 10 the extending portion 38 of the clamping surface 22 of the first clamp part 12 is operative to rest on the shoulder portion 60 of the second clamp part 14, as illustrated in FIG. 1. Similarly, an extending portion 38 of the clamping surface 22 on the second clamp part 14 may conform to the shape of the shoulder portion 60 of the first clamp part 12 so that when the first and second clamp parts 12 and 14 are placed in operative connection to form a clamp 10 the extending portion 38 of the clamping surface 22 of the second clamp part 14 is operative to rest on the shoulder portion 60 of the first clamp part 12. In an exemplary embodiment illustrated in FIG. 3, the shoulder portion 60 extending along the inner surface 18 of the clamp part 14 from the clamping surface 22 to the attachment surface 20 may begin at a transition 35 between the clamping and extending portions 36 and 38 and end at a point 37. As shown in FIG. 1, when the clamp is mounted to the gunwale 62, the gunwale 62 extends between end point 37 and the tip 34 of the nose part 28 of each clamp part. Although in this exemplary embodiment, the inner surface 18 of a nose part 28 resembles a symmetrical crescent, other variations will be suitable as well, so long as the nose part 28 and shoulder portion 60 are shaped so that they are operative to distribute a portion of the clamping forces across the shoulder portions 60 and nose parts 28 of the clamp parts 28 when first and second clamp parts 12 and 14 are in operative connection with each other to form a clamp 10. As used herein, shoulder (60) and shoulders (60) have the same meaning as shoulder portion (60) and shoulder portions (60).

The precise placement of the shoulder portion 60 and shape of the nose part 28 may vary, so long as the aperture 26 formed when two clamp parts are operatively connected is approximately the same shape as the gunwale and the nose part 28 and the shoulder 60 have corresponding shapes on the surfaces which may operatively connect. As will be described in further detail below, in alternative exemplary embodiments the aperture may have a shape which is operative to use cushioning inserts between the gunwale and the clamp.

Figure 5:
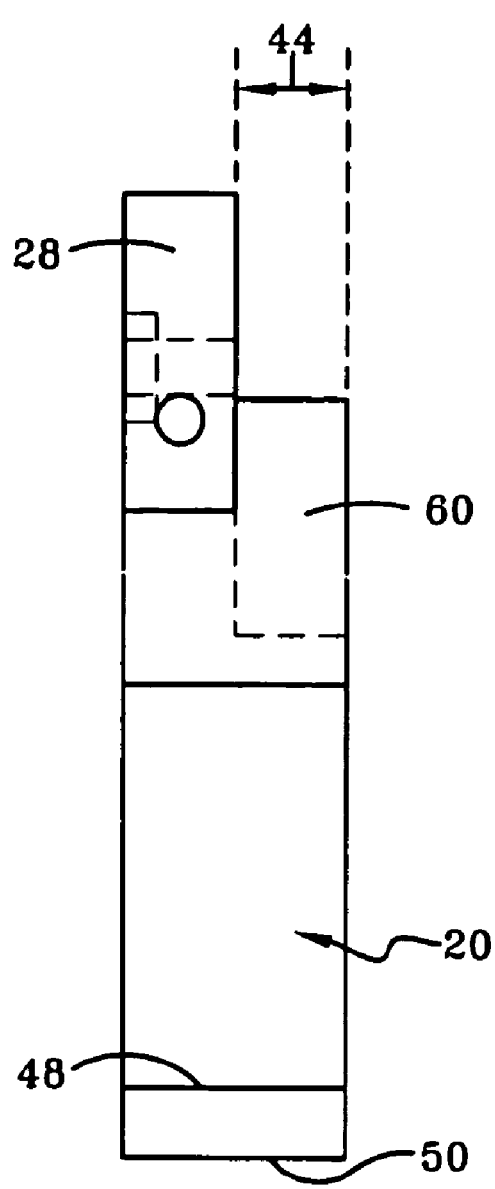
FIG. 5 shows an edge view of a clamping surface of a clamp.
Figure 4:
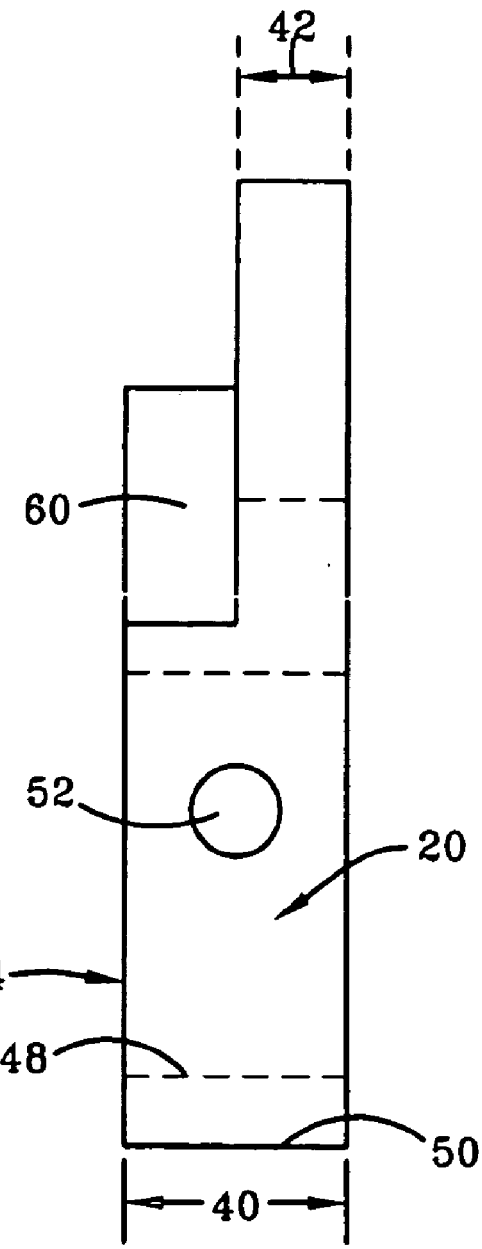
FIG. 4 shows an edge view of an attachment surface of a clamp.

As shown in FIGS. 4 and 5, the shoulder portion 60 marks a transition from a base part 24 to a nose part 28. To create the operative connection between first and second clamp parts 12 and 14, the width 42 of the nose part 28 is approximately equal to the width 44 of the shoulder 60 on which it is operative to rest. As shown in FIG. 2, the nose part 28 may extend from the shoulder 60 to the tip 34 of the nose part 28. A base part 24 may extend from the bottom of the base part 24, in the orientation illustrated in FIG. 3, to the shoulder 60. Referring back to FIG. 5, this relationship may create a base part 24 with a width 40 which may be approximately twice the width of the nose part 28. As shown in FIG. 7 the resulting clamp 10 may have a width 46, which is approximately the same as the width of the base part.

The attachment surface 20 of an exemplary embodiment of a clamp part as shown in FIG. 2, may comprise the surface of the outside of the hook shaped clamp part 12, from the tip 34 of the nose part 28 to the outer end 50 of the base part 24. An attachment surface 20 may include an attachment site 52, illustrated in FIG. 4, which is adapted to accept various brackets, fasteners, or other attaching structures which are adapted to connect to and/or support various items. In an exemplary embodiment, such an attachment site 52 may comprise a portion of the attachment surface 20 near the outer end 50 of the base part 24 which is generally planar. Such a generally planar portion may further include attachment structures, such as a threaded opening or a threaded insert embedded in the clamp part 12 at the attachment site 52. Other exemplary embodiments may include other attachment structures which are operative to receive and support a bolt, screw, or other fastener or bracket.

In other exemplary embodiments, the attachment surface 20 may be combined with other devices to connect to and/or support various items. For example, attachment sites 52 may be located at positions other than the outer end 50 of the base part 24 of a clamp part 12. There may be more than one attachment sites 52 on the attachment surface 20. In still other exemplary embodiments, the shape of the attachment surface 20 may adapted to facilitate a better mating connection between the attachment surface 20 and a bracket which may surround the clamp 10. For example, the edges of an attachment surface may be rounded rather than angled.

Figure 16:
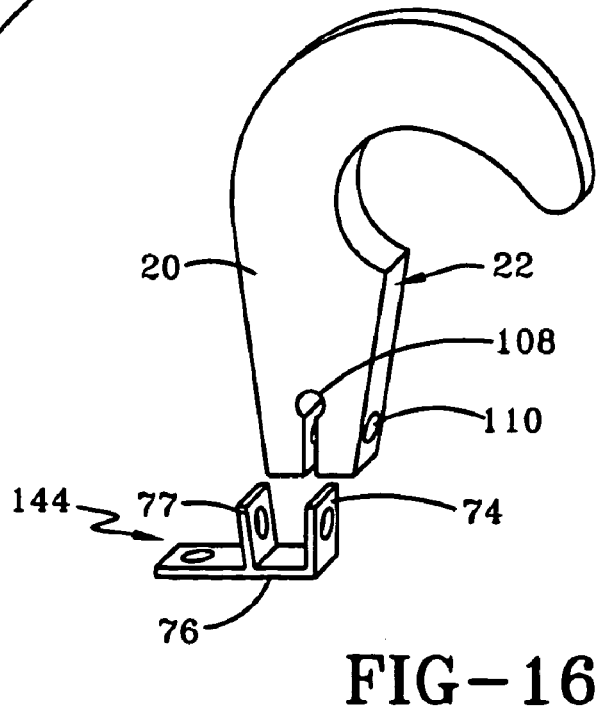
FIG. 16 shows an exploded view of the clamp part with an alternative exemplary embodiment of an L-bracket.

As shown in FIG. 16, a further exemplary embodiment of an attachment structure may comprise a keyhole slot 108 formed in the base part of the clamp part, extending between the inner and outer surfaces of the clamp part. A hole 110 may be formed through the clamp part, extending from the clamping surface 22 through the stem of the keyhole slot 108 to the attachment surface 20. The circular portion of the keyhole slot 108 may serve to reduce stress, permitting the clamping of an attachment structure which may be held in the stem portion of the keyhole slot 108, by tightening a bolt or other fastener which may be inserted through the hole 110. Exemplary embodiments of attachment structures which may be used with a keyhole slot 108 are described below.

In exemplary embodiments, additional features may be incorporated in a clamp 10 to improve the strength or versatility of the clamp. As illustrated in FIG. 9, when first and second clamp parts 12 and 14 are fastened together by a single fastener, a tensioning device such as a tensioning screw 112 may be used to increase the strength of the clamping connection between the clamp and the gunwale and hull. In an exemplary embodiment a tensioning screw 112 may pass through the nose part 28 of a first clamp part 12 from the attachment surface to the clamping surface. As the tensioning screw 112 extends through the nose part 28, it may press against the shoulder portion 60 of the second clamp part 14, forcing the base parts 24 of first and second clamp parts 12 and 14 to pivot slightly toward each other, thus decreasing the size of aperture 26 and increasing the tightness of the clamping connection.

Figure 10:
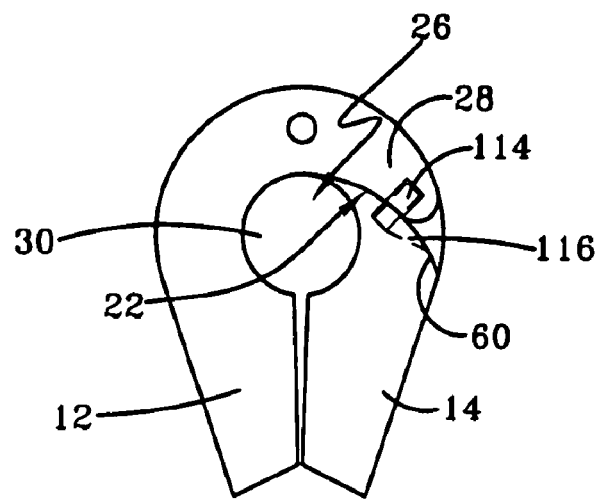
FIG. 10 shows an alternative exemplary embodiment of the clamp with a biasing protrusion.

A further tensioning device may include a biasing protrusion 114, as illustrated in FIG. 10. A biasing protrusion 114 may be incorporated in a clamping surface 22 of a nose part 28 of at least one of the first and second clamp parts 12 and 14. A corresponding detent 116 may be incorporated on the shoulder portion 60 of each corresponding second or first clamp part 14 or 12. The biasing protrusion 114 may comprise an elastomer, spring, or other biasing apparatus to bias the protrusion 114 toward its fully extended position. When placed in operative connection, the biasing protrusion 114 acts to bias a nose part 28 of a first or second clamp part 12 or 14 away from the corresponding shoulder 60 of a second or first clamp part 14 or 12. This biasing action decreases the size of an aperture 26 and increases the tightness of the clamping connection.

Figure 11:
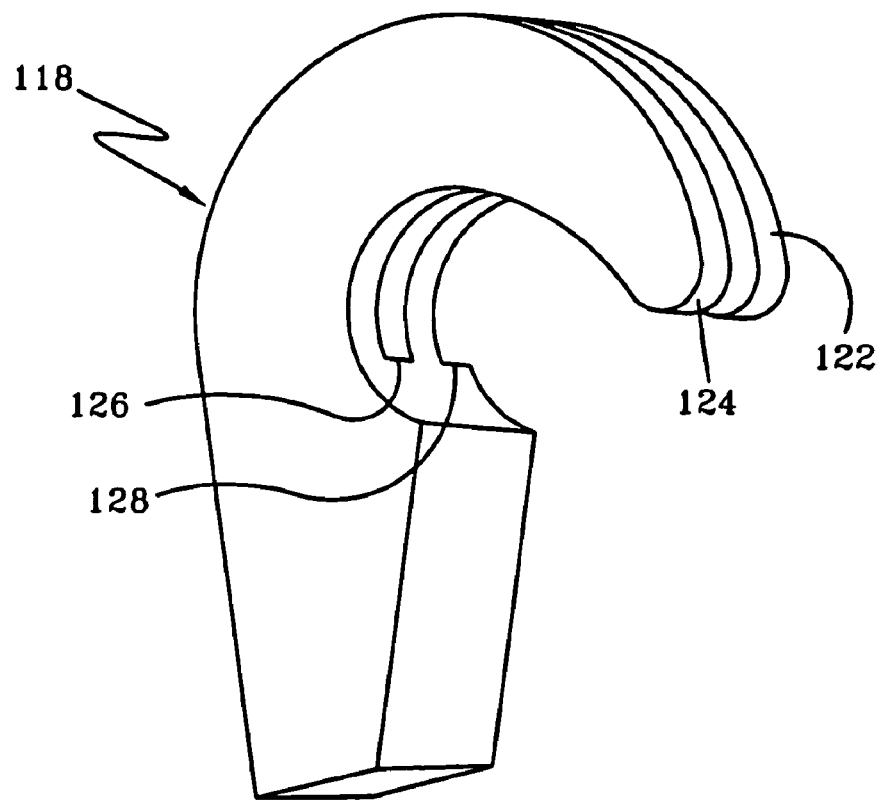
FIG. 11 shows an alternative exemplary embodiment of the clamp part with a plurality of nose parts.
Figure 12:
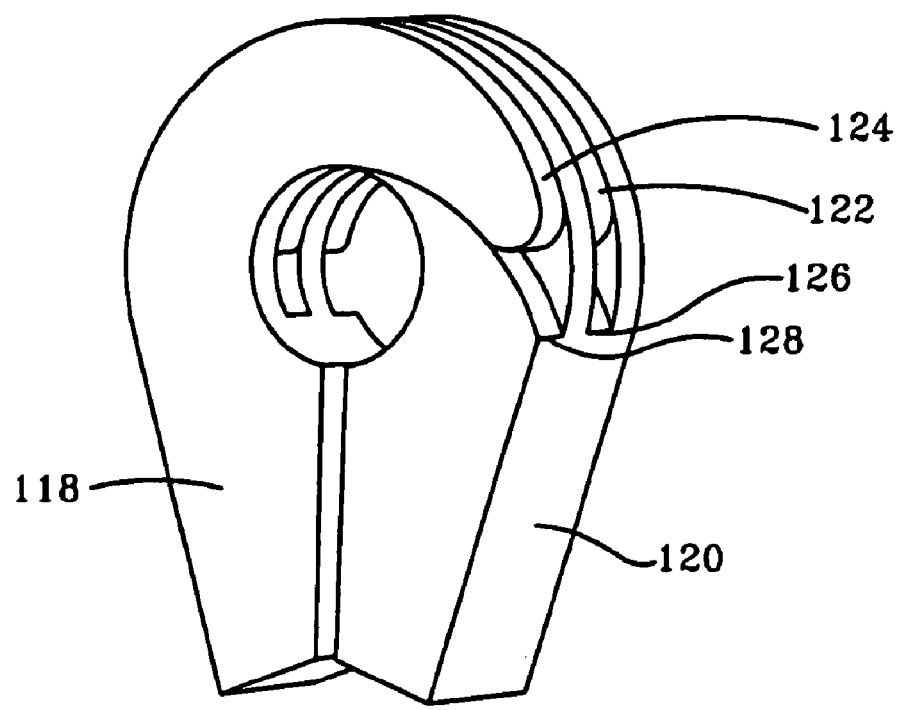
FIG. 12 shows an alternative exemplary embodiment of the clamp formed from clamp parts with a plurality of nose parts.

The extent to which the relative positions of first and second clamp parts 12 and 14 are fixed may be increased by adding additional interlocking features. An exemplary embodiment of one such feature is illustrated in FIGS. 11 and 12. Exemplary embodiments discussed thus far include a finger like nose part and an adjacent shoulder portion. Other exemplary embodiments may incorporate first and second clamp parts 118 and 120, which comprise a plurality of parallel nose parts 122 and 124, each with a corresponding adjacent shoulder 126 and 128, as illustrated in FIG. 11. A clamp 130, illustrated in FIG. 12, comprises a first clamp part 118 and a second clamp part 120 in interlocking connection. Here nose part 122 of a first clamp part 118 is operative to rest against shoulder 126 of a second clamp part 120 and nose part 124 of a first clamp part 118 is operative to rest against shoulder 128 of a second clamp part 120. Similarly, nose part 122 of a second clamp part 120 is operative to rest against shoulder 126 of a first clamp part 118 and nose part 124 of a second clamp part 120 is operative to rest against shoulder 128 of a first clamp part 118.

Figure 13:
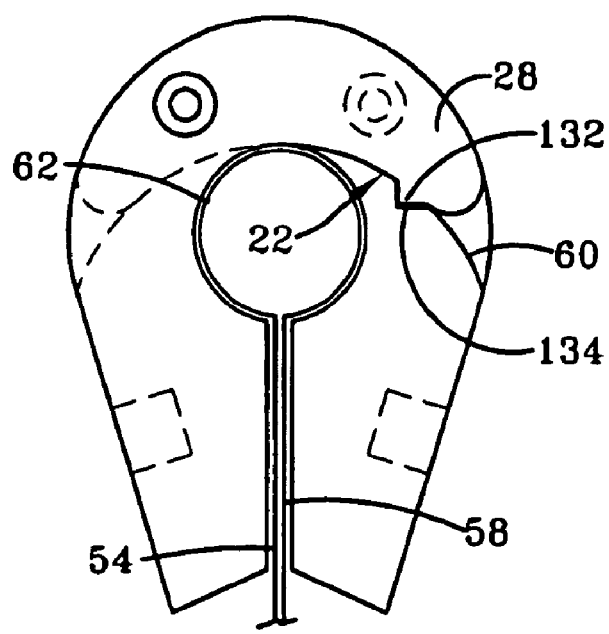
FIG. 13 shows an alternative exemplary embodiment of the clamp incorporating a fixed interlocking protrusion.

An additional interlocking exemplary embodiment is illustrated in FIG. 13. At least one fixed protrusion 132 may be formed on the clamping surface 22 of nose part 28 of a first clamp part 12. At least one mating detent 134 may be formed on the shoulder 60 of a second clamp part 14. Similarly, a fixed protrusion 132 may also be formed on the clamping surface 22 of nose part 28 of a second clamp part 12 and a mating detent 134 may be formed on the shoulder 60 of a first clamp part 14. When first and second clamp parts 12 and 14 are placed in operative connection with each other to form a clamp 10, the fixed protrusion 130 and the mating detent 132 interlock to more securely fix the relative positions of first and second clamp parts 12 and 14.

Figure 14:
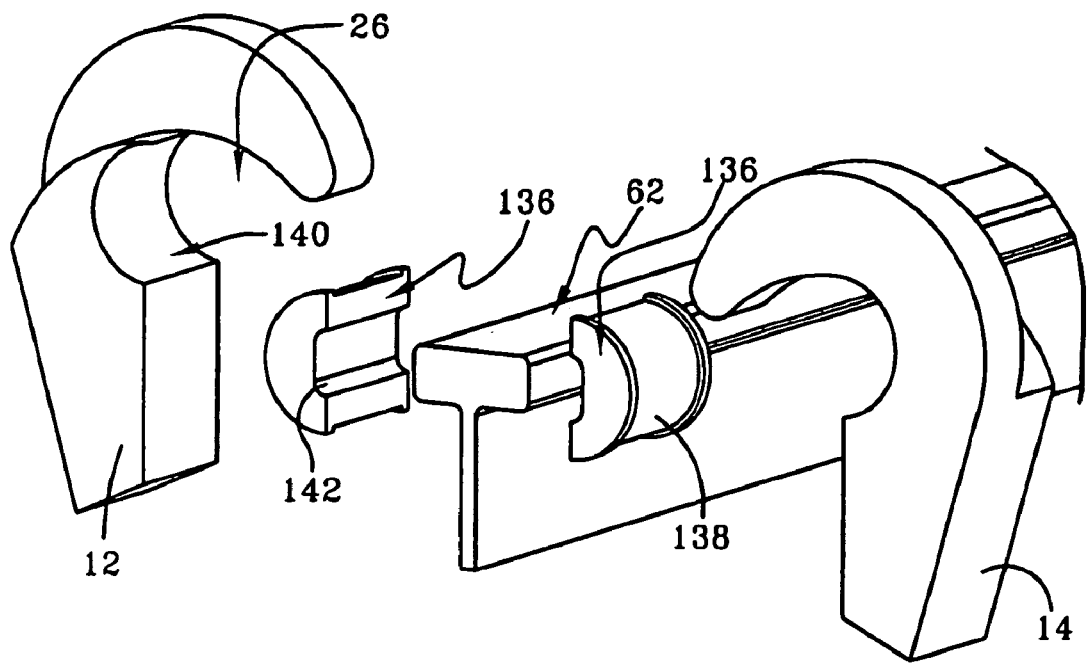
FIG. 14 shows an exploded view of the clamp attached to a square gunwale using cushioning inserts.

An exemplary embodiment of a clamp that includes a cushioning insert 136 is illustrated in FIG. 14. One or more cushioning inserts 136 may be placed between the clamp parts 12 and 14 and the gunwale 62 and/or hull of the boat. The cushioning inserts may be useful to protect the surface of the gunwale 62, or to permit a clamp to be used with a gunwale 62 which does not precisely match the aperture of a clamp 10. Such a cushioning insert 136 may be made of an elastomer, or any other suitable cushioning material which can be formed into a shape and which is sturdy enough to withstand the rigors which may accompany its use as part of a clamp 10 A cushioning insert 136 may be shaped so that it is generally semicircular, with an exterior surface 138 which conforms to the shape of the corresponding portion 140 of the interior of aperture 26. The cushioning insert 136 may further include an interior surface 142 which conforms to the corresponding shape of the gunwale 62 to which a clamp 10 may be attached. In this described exemplary embodiment, two cushioning inserts 136 may be used, with one inserted in each of clamp parts 12 and 14. However, it is to be understood that in alternative exemplary embodiments one, two, or more cushioning inserts may be used.

In exemplary embodiments, different combinations of the previously described features may be combined in one clamp. For example, a clamp comprised of first and second clamp parts and which each have a plurality of nose parts may also incorporate a biasing protrusion and corresponding detent. Similarly, a clamp comprised of first and second clamp parts and which each include a protrusion and corresponding detent may also incorporate cushioning inserts.

Figure 15:
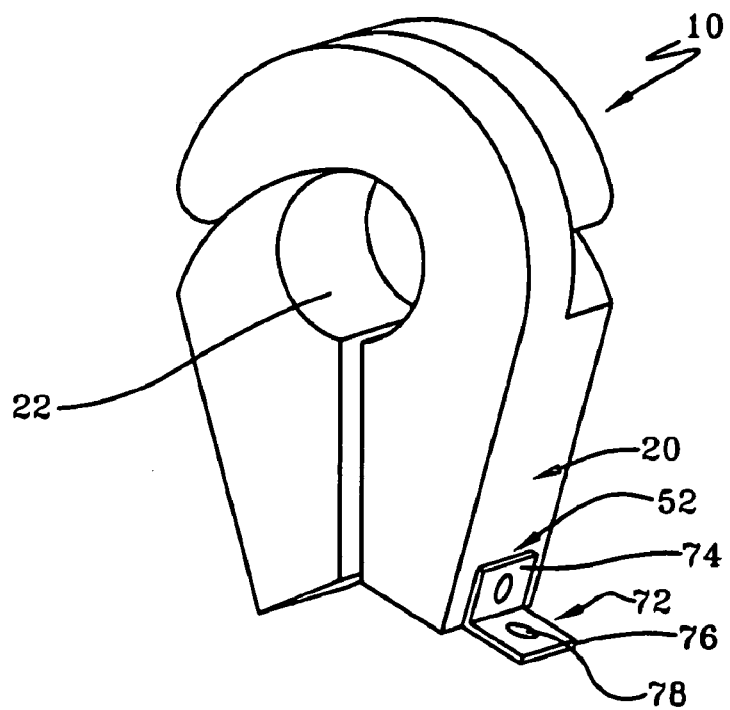
FIG. 15 shows an exemplary embodiment of the clamp with an exemplary embodiment of an L-bracket.

In exemplary embodiments, the previously described clamps may be used to attach a variety of items to a boat when used with attachment structures adapted for the desired purpose. One such attachment structure is an L-bracket, illustrated in FIG. 15, An exemplary L-bracket 72 may be comprised of a first tab 74 and a second tab 76 joined at an angle. The L-bracket may further comprise holes 78 in each of the first and second tabs 74 and 76 to accommodate using the L-bracket to fasten items to a clamp 10. A first tab 74 may be fastened to the attachment surface 20 of the clamp at an attachment site 52. This attachment may be accomplished by using fasteners such as screws, bolts or any other suitable fastener. The other tab 76 of the L-bracket 72 may be adapted to attach various devices to the clamp 10, and thus to the boat. One such adaptation comprises a hole 78 in the second tab 76 through which a bolt or screw may be passed.

A variation of an L-bracket 72, which is identified by reference numeral 144 and illustrated in FIG. 16, comprises a third tab 77 extending from the second tab 76 in approximately the same direction as the first tab 74. A third tab 77 may be angled to fit against the attachment surface 20 when the first tab 74 is inserted into a keyhole slot 108 in the base part of a clamp part. One or more of these tabs 74 and 77 may include holes or other features which facilitate attaching the modified L-bracket 144 to the clamp. This exemplary modified L-bracket 144 may be attached to the clamp part using a screw, bolt, or other suitable fastener which may be inserted through the hole 110 in the of clamp part to pass through the clamping surface 22, the first tab 74, the attachment surface 20, and the third tab 77. Items may be fastened to the second tab 76 of modified L-bracket 144 by using a bolt or screw or any other suitable fastener.

Figure 17:
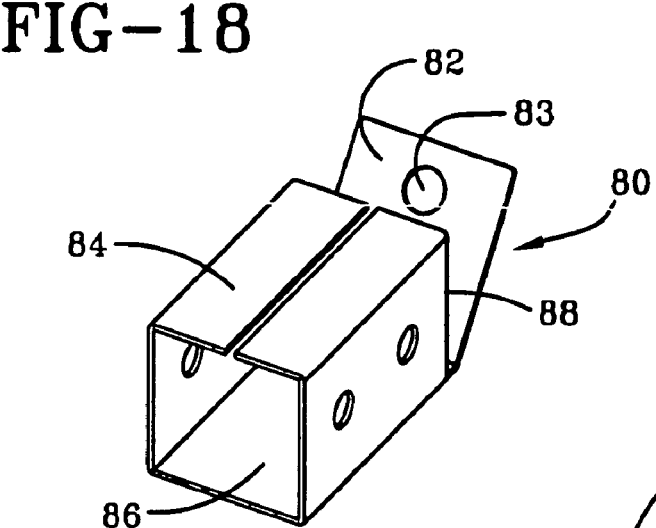
FIG. 17 shows an exemplary embodiment of an end bracket.
Figure 32:
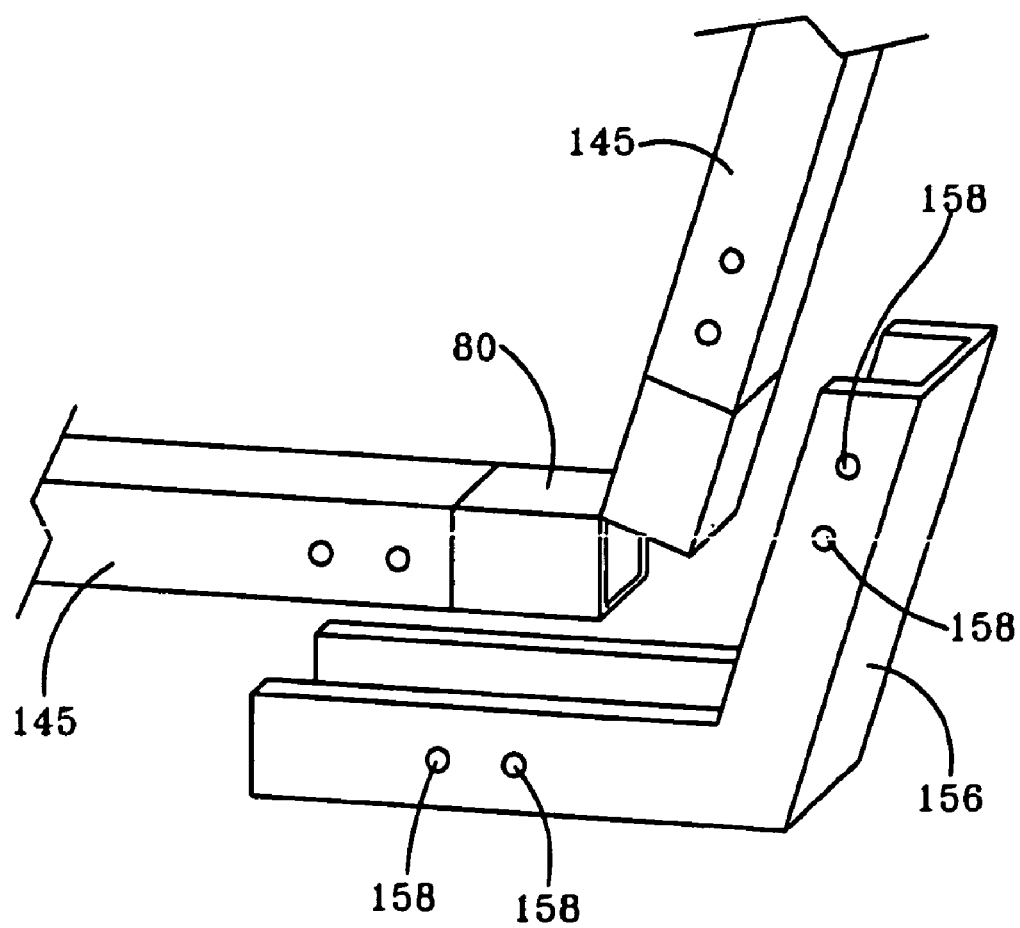
FIG. 32 shows an exploded view of an exemplary embodiment of an elastomer cushion for a joint.

An end bracket 80, illustrated in FIG. 17, may be used to attach support members 145 to the interior of the boat. An end bracket 80 may be comprised of a hollow bracket portion 84 with a first end 86, which is open, and a second end 88, and an attaching extension 82. The second end 88 of the bracket may be open, closed, or partially open, and may include an attaching adaptation such as those used at the attachment sites of a first clamp part. The internal cross sectional shape of the end bracket 80 may approximate the corresponding external cross sectional shape of a support member which may be inserted into the first end 86 of the end bracket 80. FIG. 32 shows an example of a support member 145 inserted into an end bracket 80. The term support member is used herein to refer to any structure which is operative for use on forming a device which supports items in a boat. In an exemplary embodiment, the support structure may include a rod or beam which may be used in connection with other support members 145, clamps, attaching structures, and fasteners, to create a structure to support items being attached to a boat. The cross sectional shape of such a support member 145 may be any shape including, for example, circular, triangular, rectangular, or other.

Figure 28:
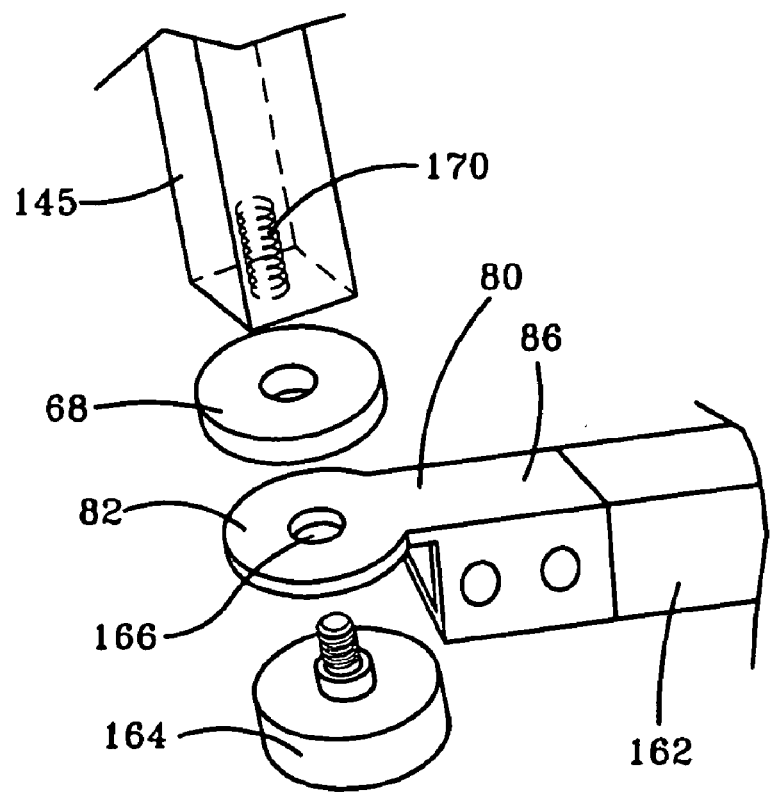
FIG. 28 shows an exploded view of a clamp attachment adapted to rotate horizontally and vertically.

Referring back to FIG. 32, a tab like attaching extension 82 may extend from the second end of an end bracket 80. Such an attaching extension 82 may be angled toward the second end 88. The attaching extension 82 may include a hole 83, through which a fastener may be inserted. Using hole 83 and fasteners, an end bracket 80 may be attached to another bracket, a support member 145, or a clamp 10. In other embodiments, the attaching extension 82 may not be angled, but may extend in a plane which contains a linear or planar portion of the bracket portion 84 from which the attaching extension 82 extends, as illustrated in FIG. 28. In still other embodiments, the attaching extension 82 may be angled away from the bracket portion 84, rather than toward it. Although in an exemplary embodiment illustrated the method of fastening the end bracket to another bracket, support member 145, or clamp 10 includes the use of a hole in the attaching extension, many other suitable attachment features may be used in other exemplary embodiments. For example, other exemplary embodiments may include brackets which are designed to snap together independently of any supplemental fasteners, or the use of appropriate adhesives.

Figure 18:
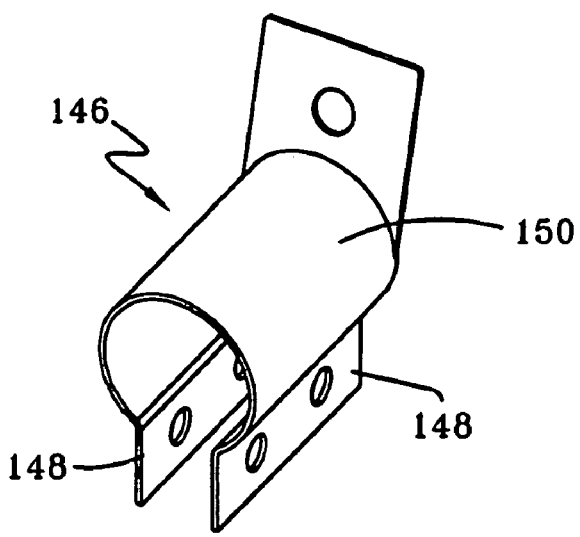
FIG. 18 shows an alternative exemplary embodiment of an end bracket incorporating a band clamp.

The shape of the bracket portion 84 may be varied to provide for more attachment flexibility. As shown in FIG. 18, one suitable variation for a bracket portion 84 is a band clamp 146, as illustrated in FIG. 18. The band portion 150 may surround a support member, and the extending tabs 148 may be drawn together by means of screws or other fasteners, to permit the band portion 150 to grip the su port member. Other suitable shapes for the bracket portion 84 may be used in exemplary embodiments.

Figure 19:
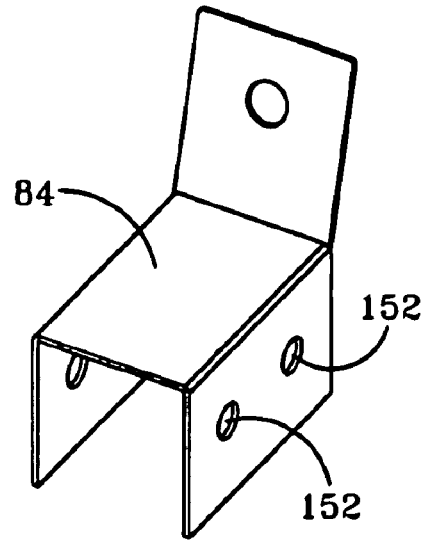
FIG. 19 shows an alternative exemplary embodiment of an end bracket incorporating a channel bracket.

As shown in FIG. 19, in other exemplary embodiments, the bracket portion 84 may incompletely surround the support member or other support structure. An exemplary bracket portion of this type may be channel shaped and include attachment holes 152 so that the bracket portion 84 may be fastened directly to the support member 145 or support structure by means of screws, bolts or other suitable fasteners.

Figure 20:
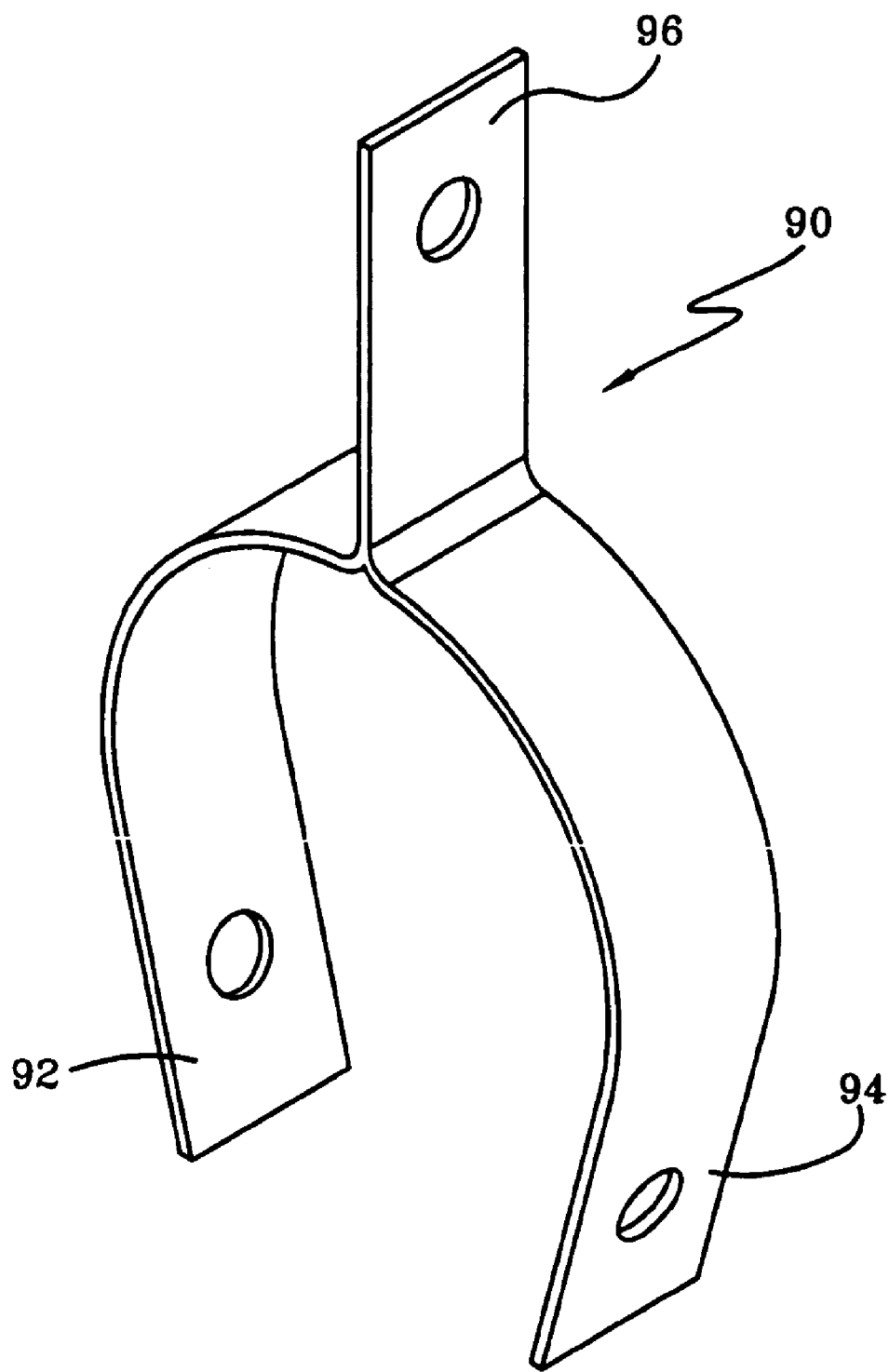
FIG. 20 shows an exemplary embodiment of a suspension bracket.

Another exemplary embodiment of a bracket, a suspension bracket 90, is illustrated in FIG. 20. A suspension bracket 90 may be roughly "Y" shaped, having first and second arms 92 and 94, and a stem 96. The first and second arms 92 and 94 of the suspension bracket 90 may each be fastened on the attachment surface of the clamp, with a first arm 92 being attached to an attachment site of a first clamp part, and a second arm 94 being attached to an attachment site of a second clamp part. In an exemplary embodiment, the first and second arms 92 and 94 may be attached to a clamp using screws or bolts or other suitable fasteners. The stem 96 of the bracket 90 may extend upward from the from the boat, and may include a hole to facilitate attaching ropes or other suspension devices to the suspension bracket 90.

Figure 21:
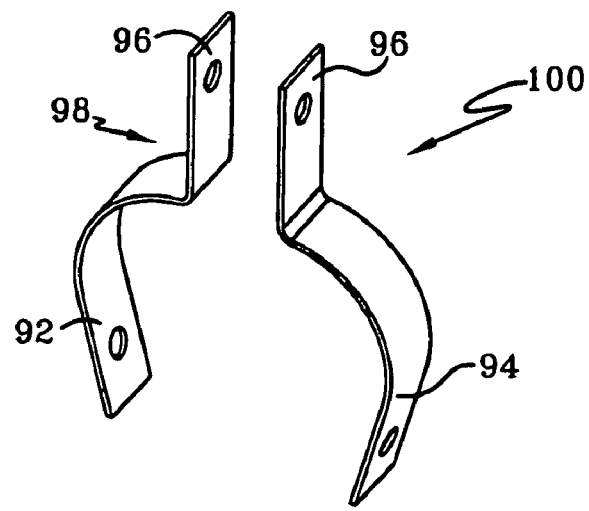
FIG. 21 shows an exemplary embodiment of a two part suspension bracket.

In this exemplary embodiment, the two arms 92 and 94 of the suspension bracket 90 meet in a single stem 96. As shown in FIG. 21, in other exemplary embodiments, the suspension bracket 90 may be comprised of two portions, a first portion 98 which includes the first arm 92 and the corresponding half of the stem 96, and a second portion 100 which includes the second arm 94 and the corresponding half of the stem 96.

Figure 22:
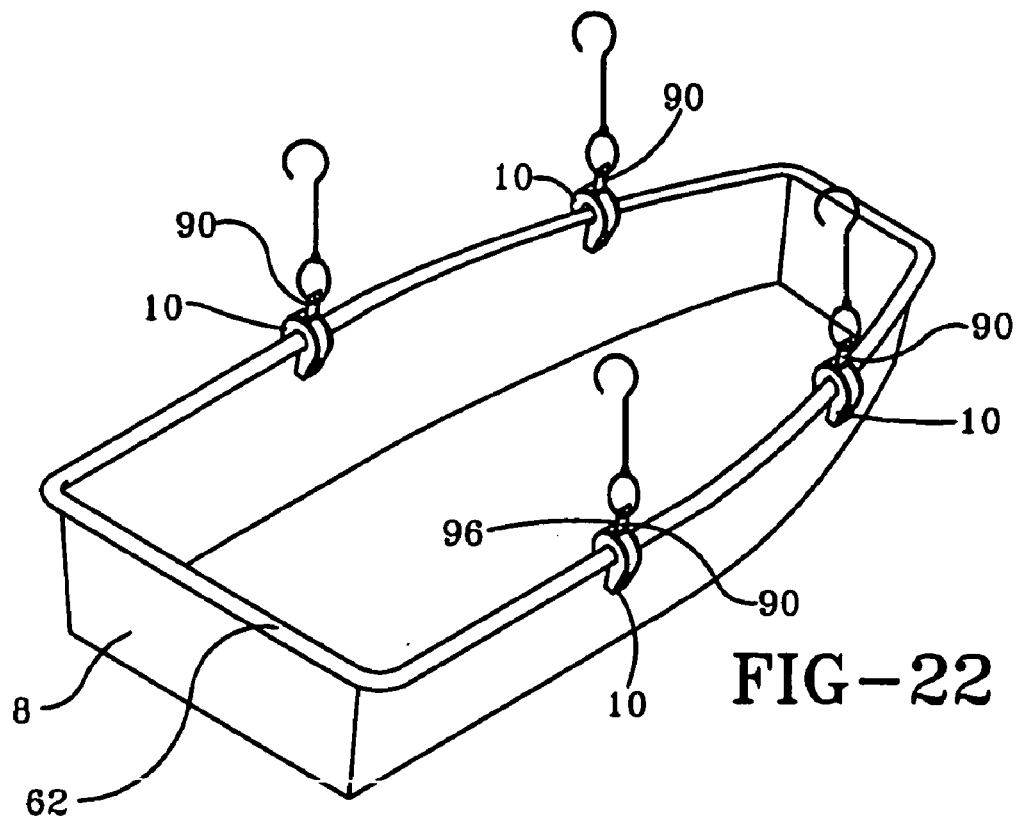
FIG. 22 shows a boat being supported using plurality of the exemplary embodiments of the clamps and suspension brackets.

As shows in FIG. 22, a boat 8 may be suspended from above by attaching a plurality of the clamps 10 to the gunwales of the boat 8. Here a suspension bracket 90 is mounted to each clamp 10 to enable the boat to be lifted by a plurality of cables threaded through holes in the stems 96 of the suspension brackets.

Figure 23:
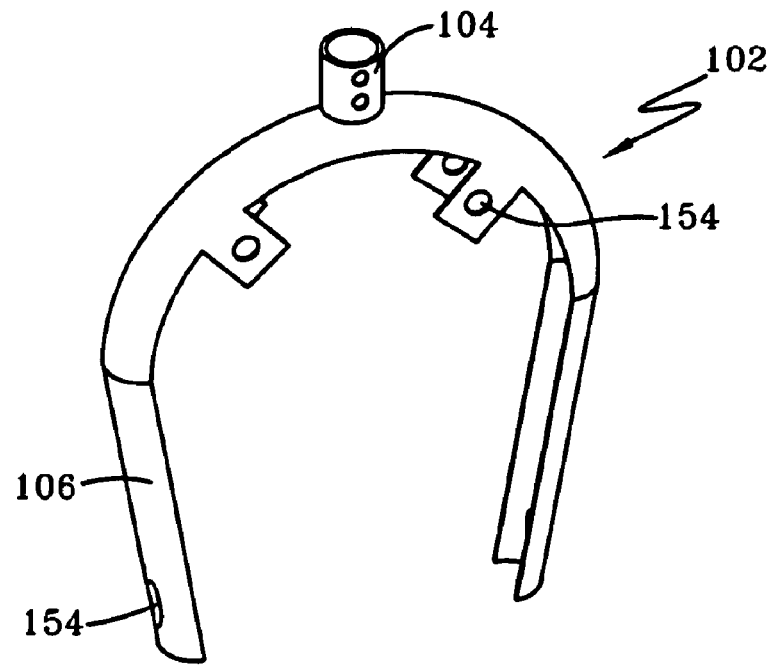
FIG. 23 shows an exemplary embodiment of a pole bracket.

FIG. 23 shows a pole bracket 102 comprised of a U-shaped bracket portion 106, which is adapted to fit in operative connection around the attachment surface of a clamp. The bracket portion 106 may include apertures 154 to permit the pole bracket 102 to be mounted to the clamp 10 using screws, bolts or other fasteners. In other exemplary embodiments, the pole bracket 102 may include tablike extensions containing apertures instead of, or in addition to the apertures in the pole bracket. A short cup 104 extending from the concave surface of the pole bracket 102 at the base of the "U" may be adapted to hold a support member in a vertical position. In an exemplary embodiment illustrated in FIG. 23, the cup 104 is cylindrical. In other embodiments, the cup 104 may be of any appropriate size and shape to grip a support member 145 and hold the support member in a vertical position. Common cross-sectional shapes for support members used for this purpose include circles, triangles, and rectangles, therefore appropriate additional shapes for the cross-section of the cup 104 designed to hold such poles upright may also include triangles and rectangles.

In an exemplary embodiment illustrated in FIG. 23, the cup 104 may be centered on the pole bracket 102, and may extend vertically when the pole bracket is attached to a clamp 10. In other exemplary embodiments, the cup 104 may be positioned off center in order to mount the support member 145 in a position other than vertical. As illustrated in FIG. 23, the cup 104 may include apertures through which it may be fastened to the support member 145 it is holding. In other exemplary embodiments, the cup 104 may be adapted by its size to hold a support member 145 without further fasteners, or fasteners which do not require apertures may be used.

Figure 29:
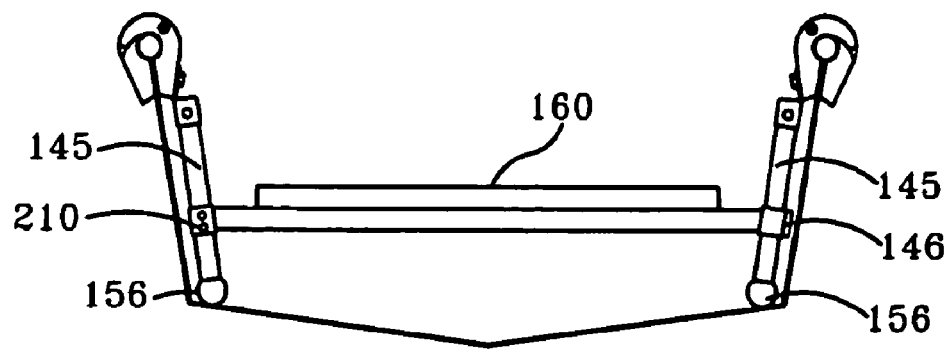
FIG. 29 shows a cross sectional view of an exemplary embodiment of a mid-level deck mounted to a boat using exemplary embodiments of the clamps.

Because many of the support members, and brackets may be forcefully bumped against the hull of the boat while being used, it may be desirable to cushion such brackets to prevent hull damage and minimize vibrations. This cushioning may be accomplished by using cushions placed between the brackets or support members and portions of the boat. Elastomer materials may be suitably durable, formable, and elastic for use as cushions. Other products known to those in the art may be suitable, as well. An exemplary embodiment of a cushion 156 is shown in FIG. 32. Such a cushion 156 may be shaped to cup the end of a support member 145 or a joint between two support members 145. An exemplary embodiment of the cushion 156 may include attachment holes 158, so that a cushion 156 may be attached to the end of a support member 145 or to the joint between two support members 145, to prevent slipping out during use. Screws, bolts or other suitable fasteners, may be used to attach a cushion 156 to the ends or joints of support members 145 or brackets which need to be cushioned. In other exemplary embodiments, a cushion 156 may be constructed in a manner adapted to stay in place without supplemental fasteners. Illustrations of other exemplary embodiments of cushions 156 are shown in FIGS. 27 and 29.

Many small boating accessories are available which boaters often wish to attach to boats. A non-exhaustive list includes oar locks, fishing rod holders, cup holders, electronic equipment brackets, light brackets for navigational lights. In order to attach such items in the past it has been necessary to use bulky devices, such as C-clamps, or to permanently affix the item to the boat by creating a hole in the hull to accommodate the item. One or more exemplary embodiments of the clamp may be used to affix these items to the boat in a non-intrusive, and non-damaging manner. A single clamp to which an L-bracket is affixed may be used to attach simple, lightweight items which require a single attachment point. Many of the items listed above can be attached using a single clamp and an L-bracket 72, illustrated in FIG. 15.

Some items may need to be attached along a single side of the boat, but require more than one attachment point. Lightweight items of this nature may be attached using a plurality of clamps 10 to which are attached a plurality of L-brackets 72. If there is a need to attach heavier items, it may be desirable to attach them using a plurality of clamps 10 to which modified L-brackets 144 (FIG. 16) may be attached. The modified L-bracket may be attached to the clamp 10 as previously described. This modified L-bracket 144 and clamp combination may be stronger, and may be capable of supporting heavier items than a simple L-bracket 72 attached to a clamp 10.

Figure 26:
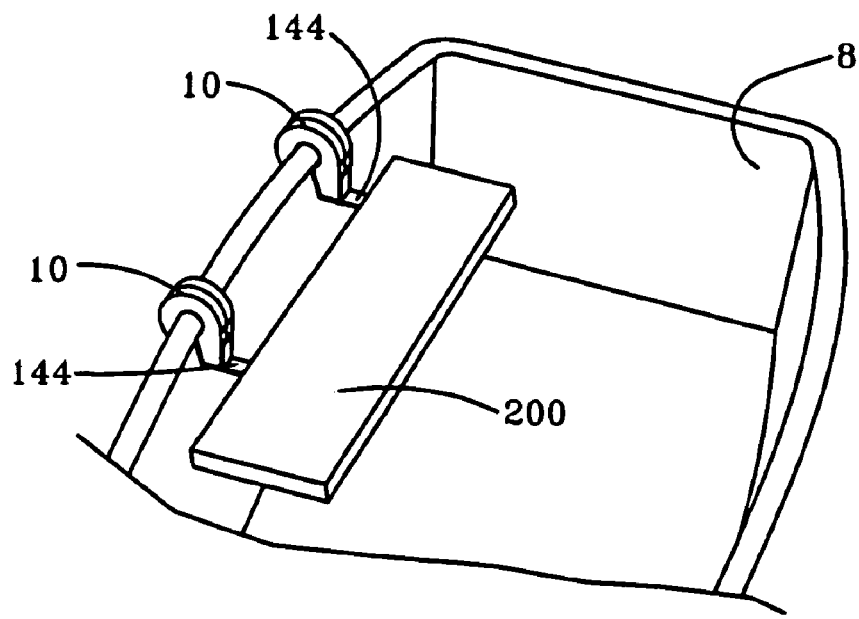
FIG. 26 shows an exemplary embodiment of a utility shelf attached to a boat using exemplary embodiments of the clamps fitted with modified L-brackets.

Using a plurality of clamps and modified L-brackets, heavier or larger items may be attached directly to the boat. As shown in FIG. 26, in alternative exemplary embodiments, clamps and modified L-brackets may be used to attach a small utility shelf 200 to the inner hull of a boat 8, to which such items may be attached or on which such items may be supported.

Figure 8:
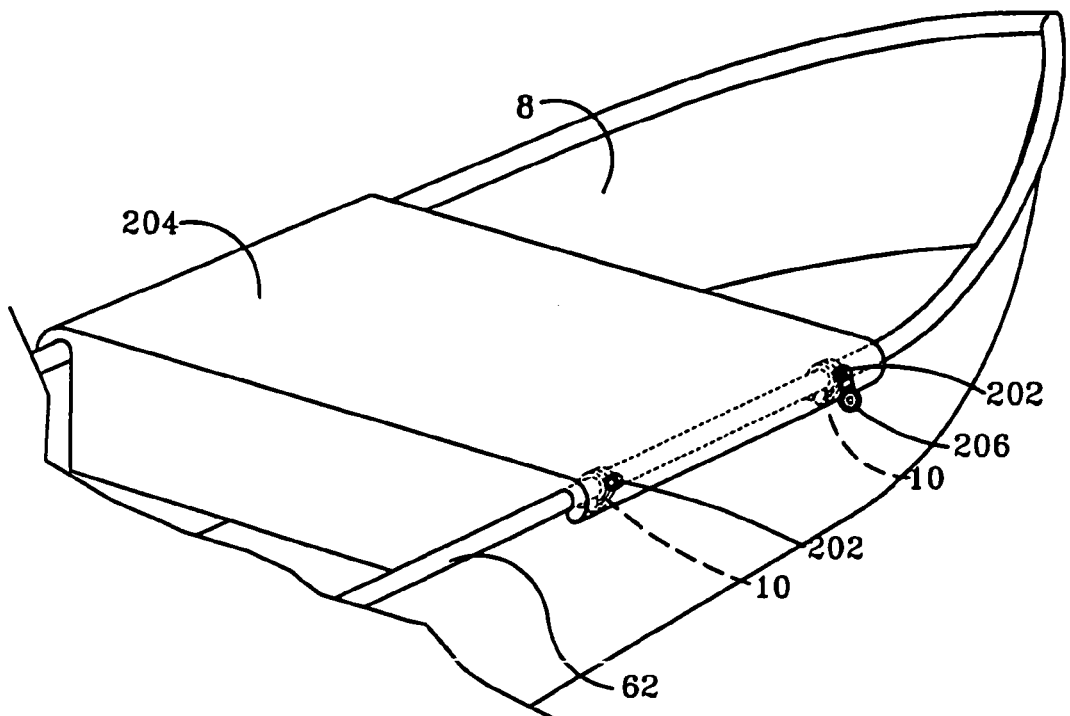
FIG. 8 shows a secured storage container attached to a boat using clamps adapted with eye bolts.

In addition to attaching smaller items, the clamps may be use to attach larger functional items to a boat. For example as shown in FIG. 8, a covered storage container 204 adapted to fit within a boat 8 may be secured to the boat using clamps 10 to which eye bolts 202 have been attached. If left unsecured, the contents of the storage container 204 may be stolen or damaged. A storage container 204 may be adapted to rest over the gunwales 62 of the boat to which a plurality of clamps may be attached. Clamps 10 may be fitted with eye bolts 202, which may be made to protrude through apertures in a storage container 204 and lid, and to accept a plurality of padlocks 206. In alternative exemplary embodiments, a bicycle type lock may be threaded through a plurality of eye bolts 202 to minimize the number of padlocks 206 needed.

It is relatively common for a boat owner to wish to install a large or small deck in a boat. This may be used, for example, to cover a storage well, to mount a trolling motor, or to support a seat. Such a deck may be installed using a plurality of the described exemplary embodiments of the clamps, brackets, fasteners, and support members.

Figure 24:
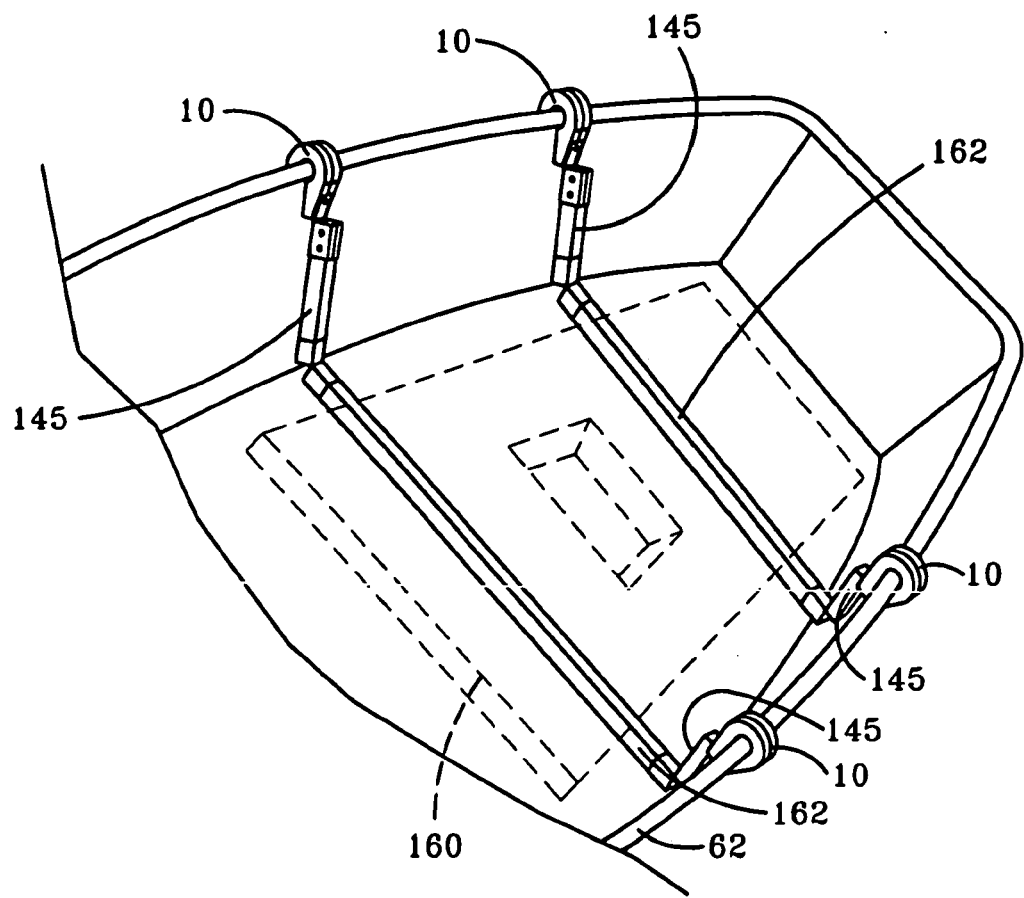
FIG. 24 shows a exemplary embodiment of a support structure for a floor deck.
Figure 34:
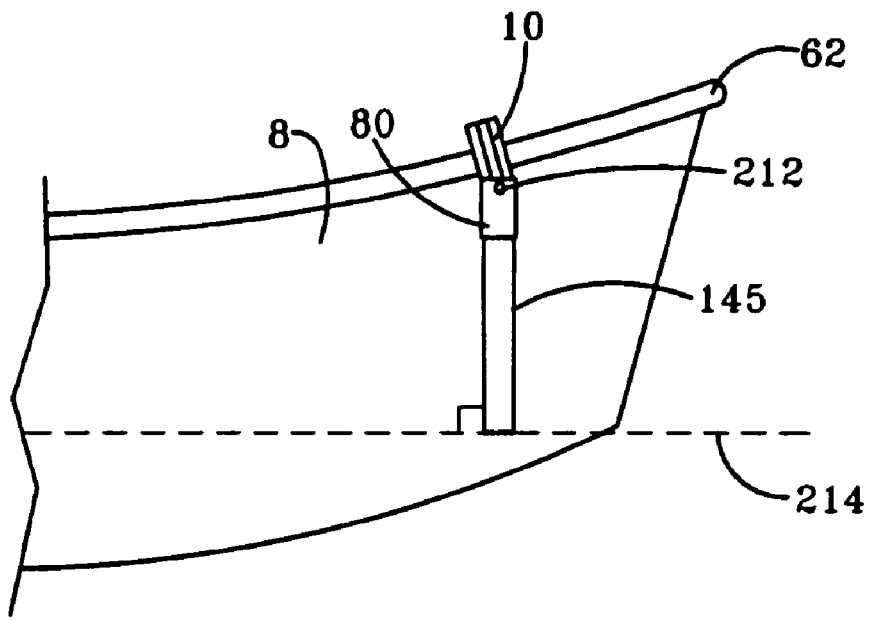
FIG. 34 shows a partially transparent side view of a boat with an exemplary embodiment of the clamp mounted to a non-horizontal gunwale.

As shown in FIG. 24, to install a deck 160 near the floor of the boat, perhaps to cover a storage well 208, it may be helpful to install two horizontal support members 162 at the desired height of the deck 160. To accomplish this, four clamps 10 may used, with two clamps 10 attached to each of two opposite gunwales 62. One vertical support member 145 may be attached to each clamp 10 using an end bracket. As shown in FIG. 34, if the gunwales 62 are not horizontal at the clamping sites, an end bracket 80 connected to the clamp 10 may need to be rotated about a fastener 212 to permit the support member to obtain a 90 degree angle with respect to a horizontal line 214.

As shown in FIG. 24, a horizontal support member 162 may be attached to each vertical support member 145 at appropriate heights so that the resulting deck 160 is level. Depending on the variance of the vertical support member 145 from true vertical and on the weight the deck 160 is intended to bear, the method of attaching the horizontal support members 162 may vary. For a light weight, non weight bearing deck, with vertical support members 145 which are nearly vertical, it may be suitable to use L-brackets 72. An L-bracket 72 may be attached to the each vertical support member 145 at the appropriate height. A horizontal support member 162 may rest on top of the second tab of the L-bracket 72, and may be attached to it by any appropriate fastening means. A deck 160 may then be placed on top of and attached to the horizontal support members 162.

For decks which require more substantial support, or for which the vertical support members are far from vertical, end bracket brackets 80 may be used to attach horizontal support members 162 to the vertical support members 145, as illustrated in FIG. 27. End brackets 80 with appropriately angled attaching extensions may be attached to each end of the horizontal support members 162. The attaching extension may be attached directly to the lower end of each vertical support member 145. One method of attachment is by screwing a threaded fastener through a hole in the attaching extension into a threaded hole tapped into the lower end of the vertical support member 145.

Figure 35:
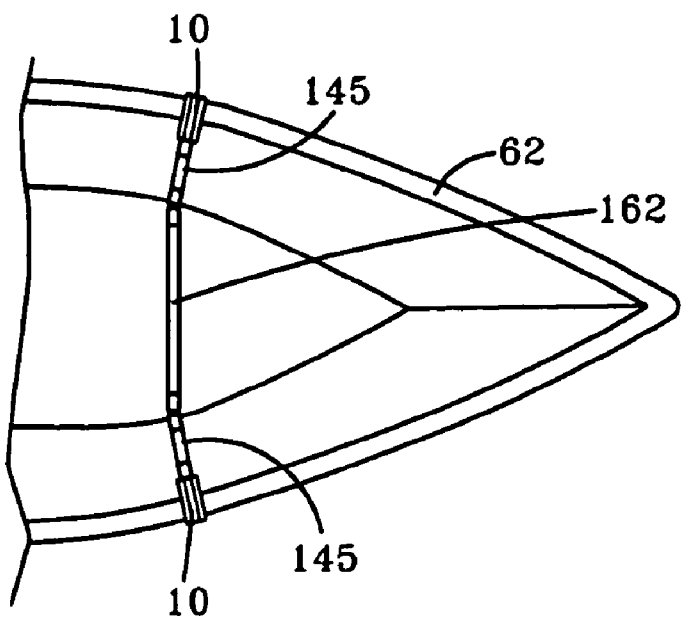
FIG. 35 shows a top view of a boat with exemplary embodiments of vertical and horizontal support members mounted to the boat with exemplary embodiments of the clamps.

One difficulty in attaching the horizontal support members 162 to the vertical support members 145 is that if the gunwales of the boat may not be parallel to each other at the sites where the clamps are attached, the vertical surfaces of the vertical support members 145 will not be parallel with each other, as may be seen in FIG. 35. This makes it difficult to attach parallel horizontal support members 162. Using L-brackets and end brackets may resolve this difficulty, as both permit the horizontal support member 162 to pivot about the fastener which attaches it to vertical support member 145. This permits the attachment of a horizontal support member at an angle to the vertical face of the vertical support member.

Another difficulty arises because the vertical support member 145 and the horizontal support member 162 are not usually perpendicular to each other What has been referred to herein as a vertical support member is not truly vertical, as can be seen in FIG. 27. Because the shape of boats, and the location of attachment of a deck 160 varies tremendously, determining the precise angle between the vertical support member 145 and the horizontal support member 162 is very difficult. Even if it an be accurately determined, there may not be an end bracket 80 available with an appropriately angled attaching extension 82. The farther the vertical support member 145 is from vertical, the more difficult it becomes to use either an L-bracket 72 or an end bracket 80 to connect the vertical support member 145 to the horizontal support member 162.

A variation of an end bracket may be used to overcome such difficulties because it permits both vertical and horizontal rotation. As illustrated in FIG. 28, an end bracket 80 with a straight attaching extension 82 may be attached to the end of one of the horizontal support members 162. A shoulder bolt 164 may be inserted through a hole in the attaching extension 82, and through a flexible bushing 168 and threaded into a tapped end 170 of a vertical support member 145. The shoulder of the shoulder bolt 164 may be smaller than the hole 166 in the attaching extension 82 of an end bracket 80. The end bracket 80, and the horizontal support member 162 to which it is attached, may be rotated horizontally about the shoulder bolt 164. In addition, the flexible bushing 168 is sufficiently deformable to permit the end bracket 80, and the horizontal support member 162 to which it is attached, to form an angle somewhat greater than or less than 90 degrees with the vertical support member 145. This provides the flexibility to arrange the horizontal and vertical support members 162 and 145 at the most advantageous angles relative to each other and to the hull of the boat in order to provide the maximum support.

In this exemplary embodiment a flexible bushing 168 was made of an elastomer material. Other durable, temporarily deformable, materials may also be suitable for use as bushings in other exemplary embodiments.

Generally the structural integrity of the support structure is enhanced by using vertical support members 145 which extend to and rest against the bottom of the boat and using horizontal members 162 of the maximum length which will fit between the vertical support members 145, as illustrated in FIGS. 24, 27, 29 and 30. This is because the hull of the boat then provides additional support and stability for the resulting structure. As noted earlier, in order to protect the hull from the ends of support members 145 and 162, it may be desirable to use cushions 156 on any end or joint which comes in contact with the hull of the boat.

If a deck is to be installed above the floor of the boat, an end bracket which attaches to the middle of a support member 145 may be more useful. For example in FIG. 29, a mid-level deck 160, is shown installed using band clamps 146 on one side and channel clamps 210 on the other.

Figure 30:
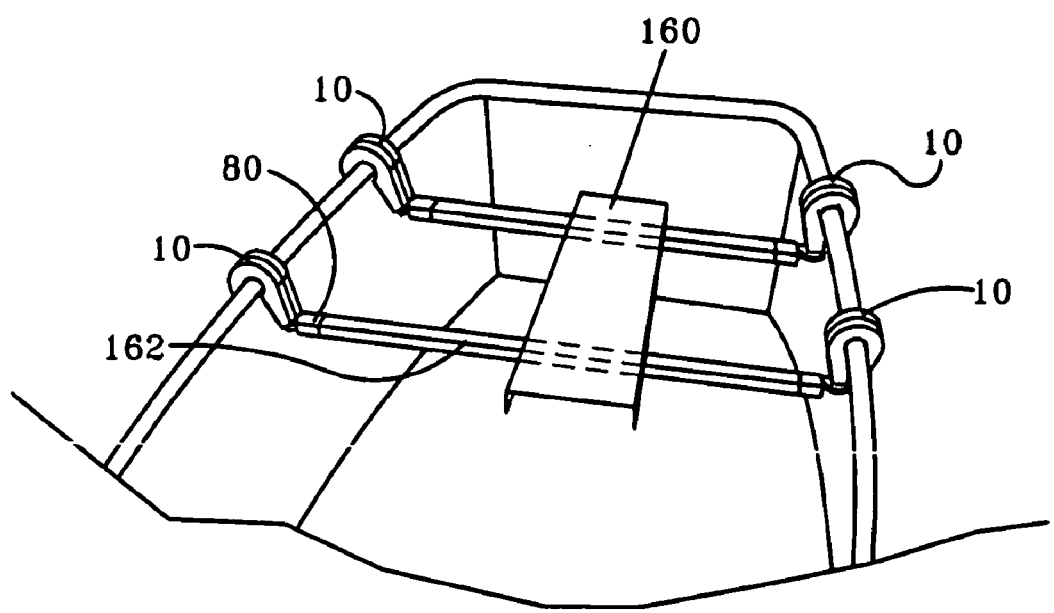
FIG. 30 shows a perspective view of an exemplary embodiment of a trolling motor platform positioned at gunwale level using exemplary embodiments of the clamps.

If a deck 160 is to be installed at the level of the gunwales 62, either an L-bracket or an end bracket 80 with an opening in the first end which is operative to accept a fastener may be attached to the clamp 10, as illustrated in FIG. 30. An end bracket 80 with a straight attaching extension may be attached to the horizontal support member 162. The two end brackets 80 may be connected together by means of a fastener which is inserted through the attaching extension of the end bracket 80 on the horizontal support member 162, into the opening on the first end of the end bracket 80 on the clamp 10. FIG. 30 generally illustrates a deck 160 designed to support a trolling motor.

Figure 31:
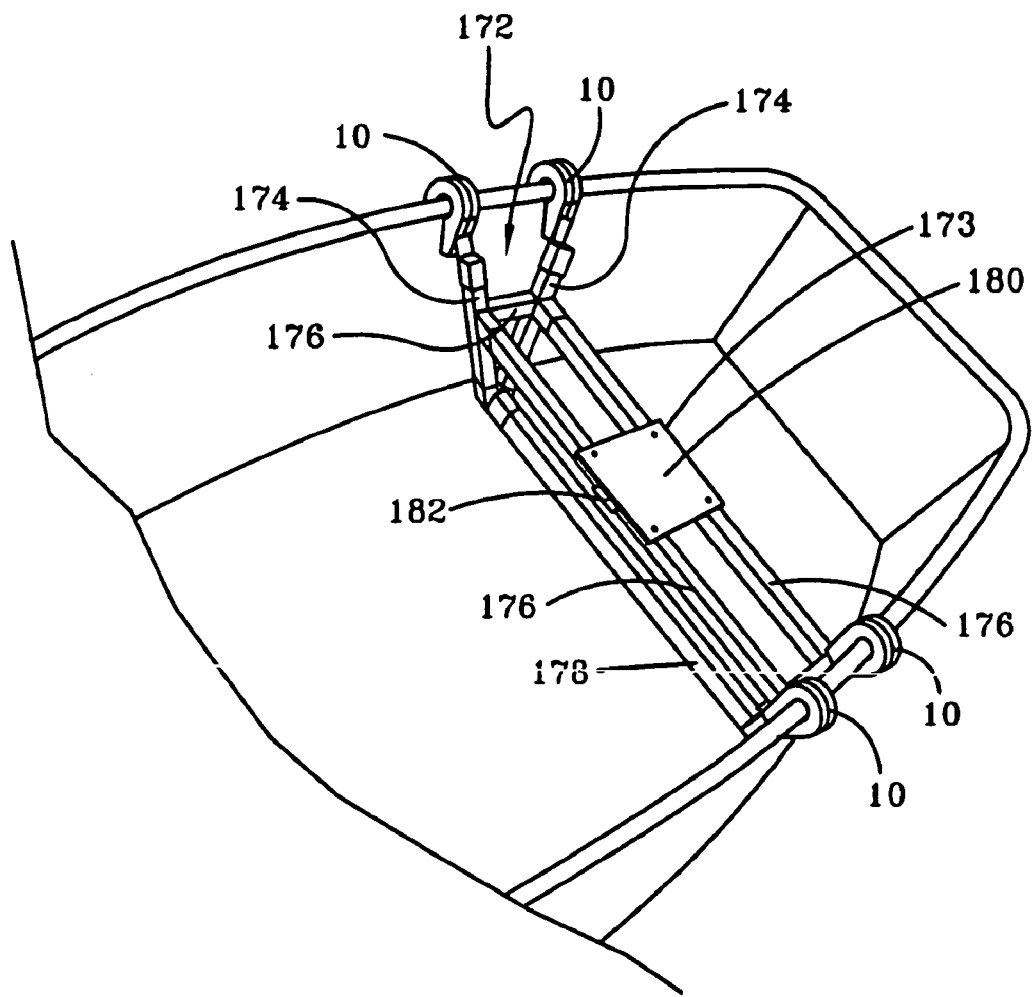
FIG. 31 shows an exemplary embodiment of an A-frame structure mounted to a boat using exemplary embodiments of the clamps.

Supporting structures other than decks may be created using combinations of support members, clamps, fasteners and brackets. As shown in FIG. 31, one such form is an inverted A-frame structure 172 which may be used to support a pedestal type seat 173, popular for fishing. An A-frame structure 172 may be created using nine support members 145, and four clamps 10, in addition to appropriate brackets and fasteners. Two clamps 10 may be attached to each of two opposite gunwales 62. The clamps on each gunwale 62 may be separated by an appropriate distance to support the seat portion 180 of a pedestal type seat. A first support member 174 may be attached to each of the clamps 10. Each first support member 174 may be of an appropriate length so that it forms a V with the first support member 174 which is attached to the adjacent clamp, such that the tip of the V rests on the bottom of the boat.

Four second support members 176 may be attached to the first support members 174, at the desired height for the seat. Each second support member 176 may be attached to two adjacent first support members 174, creating a rectangular structure partway between the gunwales 62 and the bottom of the boat. Finally, a third support member 178 may be attached across the bottom of the boat, between the points of the Vs which are created by pairs of first support members 174.

The length of each first, second, and third support member 174, 176, and 178 may be adapted to create a tight, rigid fit against the other support members and the hull of the boat. A seat portion 180 may be attached to the second support members 176 which extend across the boat at seat height. The pedestal portion 182 may be attached to the third support member 178 which extends across the bottom of the boat.

Figure 33:
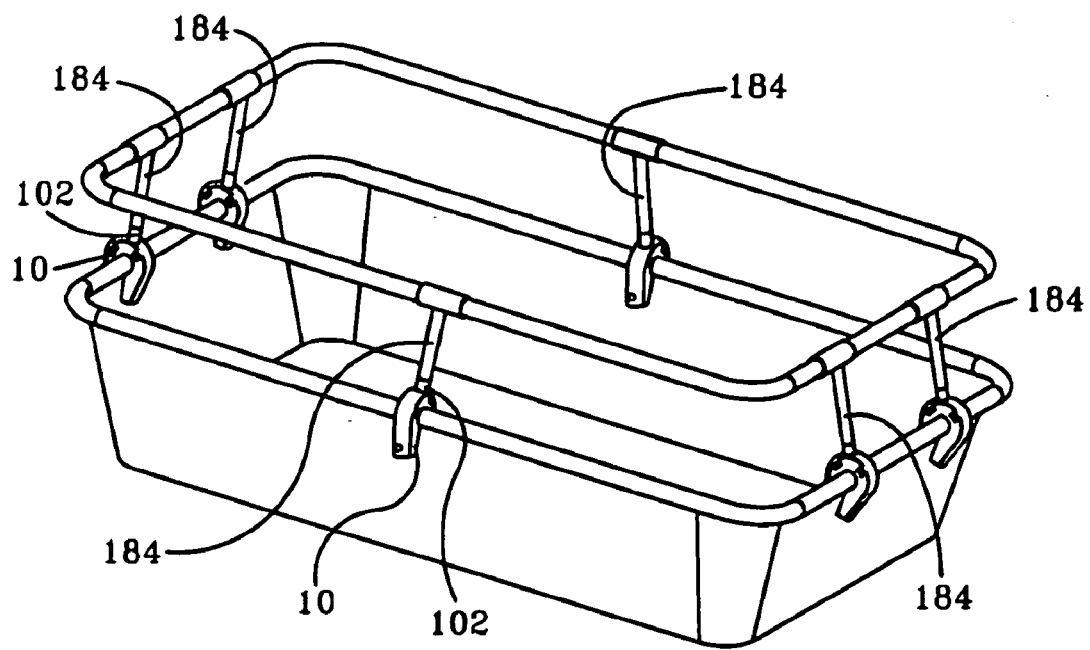
FIG. 33 shows an exemplary embodiment of a hunting blind frame supported by pole brackets to a boat.

Clamps 10 may also be used to support structures above the level of the gunwales. A hunting blind is one exemplary embodiment of such a use. A structure adapted to support camouflage cloth may be created, which may have a perimeter which matches the shape of the gunwale, and which may be supported by a plurality of vertical support members 184, as illustrated in FIG. 33. A plurality of clamps 10, to which pole brackets 102 have been attached may be clamped to the gunwales 62 at appropriate locations to support each vertical support member 184 of the hunter's blind. Vertical support members 184 may be inserted into each cup 104 on a pole bracket 102, thus supporting the hunter's blind structure above the gunwales 62 of the boat.

Figure 36:
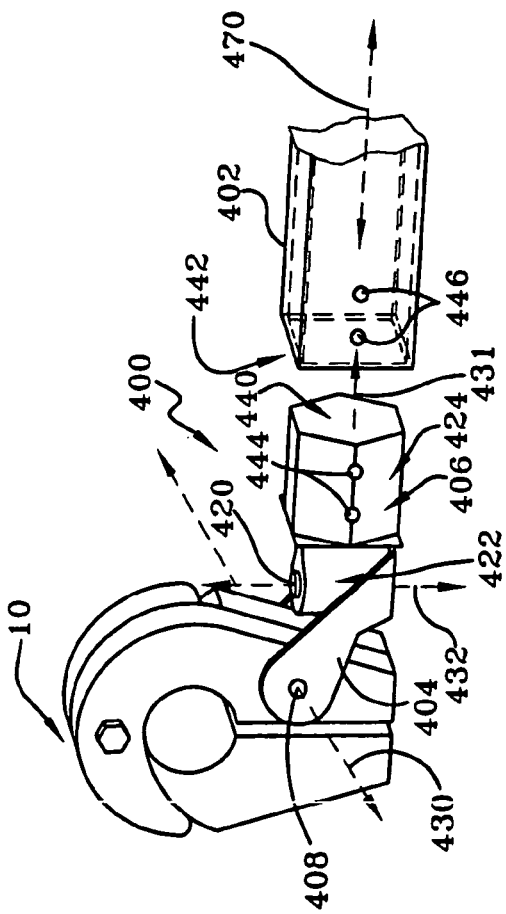
FIG. 36 shows a perspective view of bracketry which enables a support member to pivot in a plurality of dimensions with respect to a clamp.

FIG. 36 shows an exemplary embodiment of the clamp 10 is operative connection with bracketry 400 that is operative to enable support members 402 to be mounted to the clamp 10 at a plurality of different angles. Further the, bracketry 400 enables the clamp 10 to be mounted to the support member 402 at different angular positions with respect to a longitudinal axis 404 of the support member. The described exemplary embodiment of the bracketry may be operative for use in securely orientating support members, and other accessories at generally level angles for boats that have curved or angled gunwales and hulls.

Figure 40:
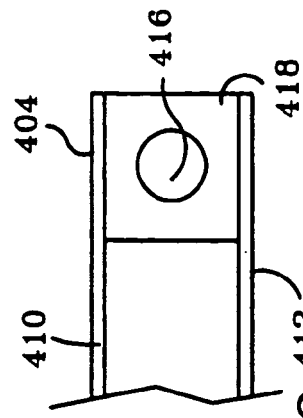
FIG. 40 show a top plan view of a pivot bracket.
Figure 39:
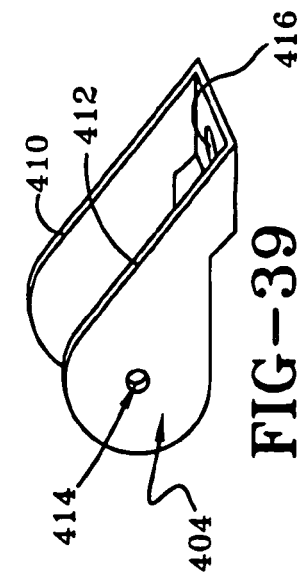
FIG. 39 shows a perspective view of a pivot bracket.

As shown in FIG. 36, the bracketry 400 may include a pivot bracket 404 and an end pivot 406. The pivot bracket 404 may be mounted to the clamp 10 with a bolt, pin or other fastener 408 through an aperture in the base part 24 of one of the clamp parts of the clamp. FIG. 39 shows a perspective view of the pivot bracket 404. FIG. 40 shows a top view of the pivot bracket 404. The pivot bracket may, include parallel sides 410, 412 with apertures 414 therethrough for receiving the fastener 408. As shown in FIG. 36, when a fastener 408 such as a bolt or pin is used to mount the pivot bracket 404 to the clamp 10, the pivot bracket 404 may be operative to pivot with respect to the clamp about a generally horizontal axis 430.

Figure 37:
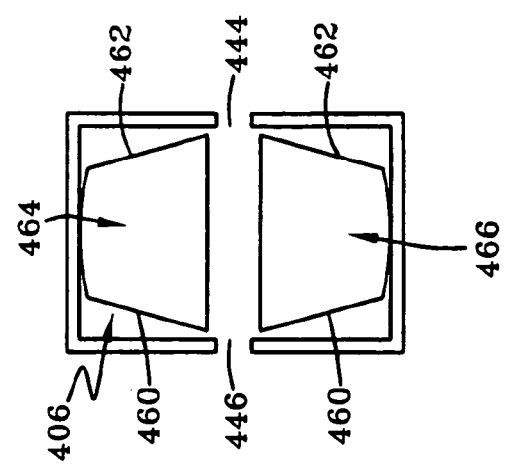
FIG. 37 shows a front side view of a projection of an end pivot.

As shown in FIG. 40, the pivot bracket 404 may include a further aperture 416 in a supporting portion 418 of the pivot bracket which connects the two parallel sides 410, 412. The further aperture 416 may be used to mount and support the end pivot 406. As shown in FIGS. 36 and 37, the end pivot may include a first end 422 and a second end 424. The first end may include an aperture 426. A bolt, pin, or other fastener 420 may be mounted through the apertures of the pivot bracket 404 and the end pivot 406 to enable the pivot end to pivot with respect to the pivot bracket 404 about a generally vertical axis 432.

Figure 38:
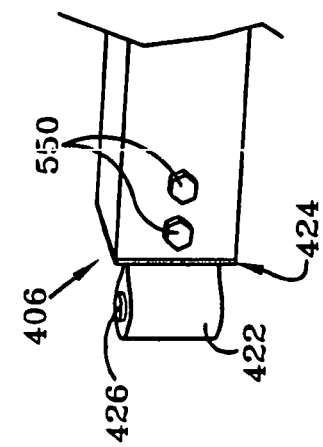
FIG. 38 shows a perspective view of an end pivot inserted into a support member.

The second end 424 of the end pivot 406 may include a projection 440. The projection 440 may be operatively sized to slide through an opening 442 in the end of a support member 402 into a hollow interior of the support member. When positioned within the opening 442 of the support member, the projection 440 may include one or more apertures 444 which are operative to align with corresponding apertures 446 in the support member 402. As shown in FIG. 38, bolts, pins or other fasteners 55Q may be inserted through the apertures 444, 446 in the projection 406 and support member 402 to lock the support member to the bracketry 400 and clamp 10.

FIG. 37 shows a cross-sectional view of the projection 440, of the end pivot 406. In an exemplary embodiment the projection of the end pivot may have a height which is greater than its width. As a result the projection may be elongated in a first direction which is perpendicular to a longitudinal axis 471 (FIG. 36) of the projection relative a second direction which is perpendicular to the longitudinal axis of the projection.

In addition opposed portions of at least two side surfaces of the projection extend in converging directions at an angle that is less than 90 degrees. For example, as shown in FIG. 37, the projection may include side surfaces 460, 462 which tapper inwardly toward the upper end 464 and towards the lower end 466 of the projection 440. The width of the projection may be greatest at a middle of the projection, while the upper and lower ends of the projection may be relatively narrower in width.

Further in exemplary embodiment the upper and lower ends 464, 466 of the projection may include rounded lower and upper surfaces. This exemplary contour of the projection of the end pivot may enable the projection to angularly move within the interior of the support member 402. In this exemplary embodiment, the support member 402 may include a generally rectangular hollow interior. The tapered contour of the projection 440 may enable the projection to pivot a plurality of degrees either clockwise or counter-clockwise with respect to the longitudinal axis 470 of the support member.

In an exemplary embodiment the apertures 444 through the projection 440 and/or the apertures 446 through the support member 402 may be sufficiently wider than the bolts, pins or other fasteners 550 used to secure the projection to the support member. The relatively wider apertures may enable the projection to be oriented at a plurality of different angular positions and still permit the fasteners 550 to pass through the apertures 446 in both the support member and the apertures 446 in the projection.

In this described exemplary embodiment, the ability of the projection 440 of end pivot 406 to pivot with respect to the longitudinal axis 470 of the support member enables the support member to be orientated at different angles compared to the angle of the gunwale. For example, as shown in FIG. 34, the clamp 10 portioned toward the front or back of the boat 8 may be orientated at a generally non vertical angle. Using the bracketry 400 shown in FIG. 36, the support member may be pivoted with respect the projection of the end pivot to enable the support member to be mounted at other angles which may be more convenient for mounting items to a boat.

The selection of a clamp 10 to use for a particular embodiment may depend on a variety of variables, including among other things, the weight of the item supported, the need to minimize movement of the supported item and the ease of installation. The composition of the clamp, as well as the shape, the use of biasing protrusions, and interlocking features may be selected for their adaptation to a particular use. Similarly, the selection of one or more appropriate brackets will depend on a number of similar factors, as will the precise shape of the structure created, and whether cushioning is used. Platform supports, and an A-frame support have been illustrated and discussed. Any other support structure of suitable shape may be created using a plurality of clamps, brackets, support structures, and fasteners, and a variety of desirable shapes will be obvious to those skilled in the arts.

It should be understood that the embodiments as shown and described herein are exemplary. Other embodiments within the scope of the present invention will be apparent to those having skill in the art from the teachings herein.

Thus the exemplary clamps, brackets, and supporting structures described herein achieve one or more of the above stated objectives, eliminates difficulties encountered in use of prior devices and systems, solves problems and achieves the desirable results described herein.

In the foregoing description certain terms have been used for brevity, clarity and understanding, however no unnecessary limitations are to be implied therefrom because such terms are used for descriptive purposes and are intended to be broadly construed. Moreover, the descriptions and illustrations herein are by way of examples and the invention is not limited to the exact details shown and described.

In the following claims any feature described as a means for performing a function shall be construed as encompassing any means known to those skilled in the art to be capable of performing the recited function, and shall not be limited to the features and structures shown herein or mere equivalents thereof. The description of the exemplary embodiment included in the Abstract included herewith shall not be deemed to limit the invention to features described therein.

Having described the features, discoveries and principles of the invention, the manner in which it is constructed and operated, and the advantages and useful results attained; the new and useful structures, devices, elements, arrangements, parts, combinations, systems, equipment, operations, methods and relationships are set forth in the appended claims.

I claim:

1. A method for mounting at least one item to a gunwale of a boat comprising:
    a) placing a first clamp part adjacent a first side of a gunwale of a boat;
    b) placing a second clamp part adjacent a second side of the gunwale; and
    c) fastening the first clamp part and the second clamp part together to form a clamp wherein the fastened first clamp part and second clamp part form an aperture including an opening portion that extends around the gunwale, wherein the aperture further includes a stem portion that extends adjacent each side of a portion of a hull of the boat which is in operative connection with the gunwale, wherein a width of the stem portion is narrower than the width of the gunwale, and wherein the fastening includes:
    d) placing a nose part of the first clamp part adjacent a shoulder portion of the second clamp part; and
    e) placing a nose part of the second clamp part adjacent a shoulder portion of the first clamp part;
    f) locking the first and second clamp parts together with at least one fastener wherein the fastener is positioned through an aperture that extends through both the first and second clamp parts, wherein the first clamp part is operative to pivot with respect to the second clamp part about the fastener, wherein the shoulder portion of each of the first and second clamp parts are operative to contact the adjacent nose parts of the first and second clamp parts and prevent the first and second clamp parts from pivoting to a position which enables the gunwale to pass through the stem portion of the aperture.

2. The method according to claim 1, wherein in step (c) the shoulder portions of the first clamp part and the second clamp part are positioned on opposed sides of the gunwale, wherein the nose parts of the first and second clamp parts extend around at least a portion of the gunwale to contact the shoulder portions.

3. A method for mounting at least one item to a gunwale of a boat comprising:

a) placing a first clamp part adjacent a first side of a gunwale of a boat;

b) placing a second clamp part adjacent a second side of the gunwale; and c) fastening the first clamp part and the second clamp part together to form a clamp including:

d) placing a nose part of the first clamp part adjacent a shoulder portion of the second clamp part; and e) placing a nose part of the second clamp part adjacent a shoulder portion of the first clamp part;

f) mounting at least one bracket including a projection, to at least one of the first and second clamp parts; and g) mounting at least one item, to the bracket, wherein at least one item includes a support member, and wherein the at least one item is operative to pivot with respect to the clamp, and wherein the mounting includes placing the projection through an opening in the support member, wherein the support member is operative to pivot with respect to the projection;

h) transversely mounting at least one fastener through the support member and the projection.

4. The method according to claim 3, wherein in step (f) the projection is elongated in a first direction generally perpendicular to a longitudinal axis of the projection relative to a second direction generally perpendicular to the longitudinal axis of the projection, wherein opposed portions of at least two side surfaces of the projection extend in converging directions at an angle that is less than 90 degrees.

5. The method according to claim 3, wherein the projection includes at least one aperture therethrough which transverses the longitudinal axis of the projection, wherein in step (f) the at least one fastener extends through the at least one aperture.

6. A method for mounting items to a gunwale of a boat comprising:

a) placing two clamp parts adjacent opposed sides of a gunwale of a boat, wherein each clamp part include a nose part which curves around an uppermost point on the gunwale; and b) fastening the clamp parts together with at least one fastener that extends through each nose part of the clamp parts, wherein the fastened clamp parts form a clamp with an aperture including an opening portion that extends around the gunwale, wherein the aperture further includes a stem portion that extends adjacent each side of a portion of a hull of the boat which is in operative connection with the gunwale, wherein a width of the stem portion is narrower than the width of the gunwale, including c) placing a nose part of a first one of the clamp parts adjacent a shoulder portion of a second one of the clamp part; and d) placing a nose part of the second one of the clamp parts adjacent a shoulder portion of the first one of the clamp parts;

wherein the shoulder portions extend adjacent the opposed sides of the gunwale, wherein the clamp parts are operative to pivot with respect to each other about the at least one fastener, wherein the shoulder portions of each of the clamp parts are operative to contact the adjacent nose parts of each of the clamp parts and prevent the clamp parts from pivoting to a position which enables the gunwale to pass through the stem portion of the aperture.

7. An apparatus of mounting items to a gunwale of a boat comprising:

at least two clamp parts, wherein each clamp part includes a nose part and a shoulder portion;

at least one fastener which extends through each nose part of the clamp parts, wherein the clamp parts are operative to pivot with respect to each other about the at least one fastener;

wherein the nose part of a first one of the clamp parts is operative to extend into abutting contact with the shoulder portion of a second one of the clamp parts, wherein the nose part of the second one of the clamp parts is operative to extend into abutting contact with the shoulder portion of the first one of the clamp parts;

an aperture bounded by the clamp parts, wherein the aperture includes an opening portion that is operative to extend around the gunwale of a boat, wherein the aperture further includes a stem portion that is operative to extend adjacent each side of a portion of a hull of the boat, wherein a width of the stem portion is narrower than the width of the gunwale, wherein the shoulder portions of each of the clamp parts are operative to contact the adjacent nose parts of each of the clamp parts and prevent the clamp parts from pivoting to a position which enables the gunwale to pass through the stem portion of the aperture.

8. The apparatus according to claim 7, furthering comprising:

The boat, wherein the boat includes the hull, wherein the hull includes the gunwale.

9. An apparatus of mounting items to a gunwale of a boat comprising:

a boat, wherein the boat includes a hull, wherein the hull includes a gunwale;

a clamp, wherein the clamp includes:

at least two clamp parts, wherein each clamp part includes a nose part and a shoulder portion;

at least one fastener which extends through each nose part of the clamp parts;

wherein the nose part of a first one of the clamp parts extends adjacent the shoulder portion of a second one of the clamp parts, wherein the nose part of the second one of the clamp parts extends adjacent the shoulder portion of the first one of the clamp parts, wherein the shoulder portions extend adjacent opposed sides of the gunwale, wherein the nose parts of each of the clamp parts extend around at least a portion of the gunwale to contact the shoulder portions;

an aperture bounded by the clamp parts, wherein the aperture includes an opening portion that extends around the gunwale, wherein the aperture further includes a stem portion that extends adjacent each side of a portion of the hull, wherein a width of the stem portion is narrower than the width of the gunwale;

wherein the clamp parts are operative to pivot with respect to each other about the at least one fastener, wherein the shoulder portions of each of the clamp parts are operative to contact the adjacent nose parts of each of the clamp parts and prevent the clamp parts from pivoting to a position which enables the gunwale to pass through the stem portion of the aperture.

10. The apparatus according to claim 9, further comprising at least one bracket in pivoting connection with at least one of the first and second clamp parts.

11. The apparatus according to claim 10, further comprising a support member in pivoting connection with the at least one bracket, wherein the support member includes an opening to a hollow interior within the support member, wherein in the bracket includes a projection that extends into the support member, wherein the support member is operative to pivot with respect to the projection.

12. The apparatus according to claim 11, further comprising at least one fastener transversely mounted through the support member and the projection.

13. The apparatus according to claim 12, wherein the projection is elongated in a direction that is generally perpendicular to a longitudinal axis of the projection relative to a second direction that is perpendicular to the longitudinal axis of the projection, wherein opposed portions of at least two side surfaces of the projection extend in converging directions at an angle that is less than 90 degrees.

14. The apparatus according to claim 13, wherein the projection includes at least one aperture therethrough which transverses the longitudinal axis of the projection, wherein the at least one fastener extends through the at least one aperture that transverse the longitudinal axis of the projection.

15. An apparatus for mounting items to a gunwale of a boat comprising:

a boat, wherein the boat includes a hull, wherein the hull includes a gunwale;

a clamp, wherein the clamp includes:

at least two clamp parts, wherein each clamp part includes a nose part and a shoulder portion;

wherein the nose part of a first one of the clamp parts extends adjacent the shoulder portion of a second one of the clamp parts, wherein the nose part of the second one of the clamp parts extends adjacent the shoulder portion of the first one of the clamp parts, wherein the shoulder portions extend adjacent opposed sides of the gunwale, wherein the nose part of each clamp part extends around at least a portion of the gunwale to contact the shoulder portion of the other clamp part to prevent the clamp from rotating open and releasing the gunwale;

an aperture bounded by the clamp parts, wherein the aperture includes an opening portion that extends around the gunwale, wherein the aperture further includes a stem portion that extends adjacent each side of a portion of the hull below the gunwales, wherein a width of the stem portion is narrower than the width of the gunwale.

* * * * *